(12) United States Patent
Kothbauer et al.

(10) Patent No.: US 12,240,494 B2
(45) Date of Patent: Mar. 4, 2025

(54) METHOD AND SYSTEM FOR REMOTE ASSISTANCE OF AN AUTONOMOUS AGENT

(71) Applicant: May Mobility, Inc., Ann Arbor, MI (US)

(72) Inventors: Melinda Kothbauer, Ann Arbor, MI (US); Jeff Sterniak, Ann Arbor, MI (US); Edwin B. Olson, Ann Arbor, MI (US)

(73) Assignee: May Mobility, Inc., Ann Arbor, MI (US)

( * ) Notice: Subject to any disclaimer, the term of this patent is extended or adjusted under 35 U.S.C. 154(b) by 0 days.

(21) Appl. No.: 18/086,832

(22) Filed: Dec. 22, 2022

(65) Prior Publication Data

US 2023/0127379 A1   Apr. 27, 2023

Related U.S. Application Data

(63) Continuation of application No. 17/826,655, filed on May 27, 2022, now Pat. No. 11,565,717.
(Continued)

(51) Int. Cl.
*B60W 60/00* (2020.01)
*B60W 40/02* (2006.01)
(Continued)

(52) U.S. Cl.
CPC ........ *B60W 60/0011* (2020.02); *B60W 40/02* (2013.01); *G05D 1/0011* (2013.01);
(Continued)

(58) Field of Classification Search
None
See application file for complete search history.

(56) References Cited

U.S. PATENT DOCUMENTS

| 5,544,282 A | 8/1996 | Chen et al. |
| 6,199,013 B1 | 3/2001 | Oshea |

(Continued)

FOREIGN PATENT DOCUMENTS

| JP | 2011100492 A | 5/2011 |
| JP | 2015083417 A | 4/2015 |

(Continued)

OTHER PUBLICATIONS

Cunningham, A. , et al., "MPDM: Multipolicy Decision-Making in Dynamic, Uncertain Environments for Autonomous Driving", Proceedings of the IEEE International Conference on Robotics and Automation (ICRA) (2015).
(Continued)

*Primary Examiner* — Jonathan M Dager
(74) *Attorney, Agent, or Firm* — Jeffrey Schox; Diana Lin

(57) ABSTRACT

A system 100 for remote assistance of an autonomous agent can include and/or interface with any or all of: a sensor suite 110, a computing system 120, a communication interface 130, and/or any other suitable components. The system can further optionally include a set of infrastructure devices 140, a teleoperator platform 150, and/or any other suitable components. The system 100 functions to enable information to be exchanged between an autonomous agent and a tele-assist. Additionally or alternatively, the system 100 can function to operate the autonomous agent (e.g., based on remote inputs received from a teleoperator, indirectly, etc.) and/or can perform any other suitable functions.

21 Claims, 10 Drawing Sheets

Related U.S. Application Data

(60) Provisional application No. 63/195,774, filed on Jun. 2, 2021.

(51) Int. Cl.
*G05D 1/00* (2006.01)
*G05D 1/223* (2024.01)

(52) U.S. Cl.
CPC ......... *G05D 1/223* (2024.01); *B60W 2554/20* (2020.02); *B60W 2554/4041* (2020.02); *B60W 2556/45* (2020.02)

(56) References Cited

U.S. PATENT DOCUMENTS

| | | | |
|---|---|---|---|
| 9,129,519 B2 | 9/2015 | Aoude et al. | |
| 9,274,525 B1 | 3/2016 | Ferguson et al. | |
| 9,368,026 B1 | 6/2016 | Herbach et al. | |
| 9,495,874 B1 | 11/2016 | Zhu et al. | |
| 9,507,346 B1* | 11/2016 | Levinson | G06F 3/04847 |
| 9,618,938 B2 | 4/2017 | Olson et al. | |
| 9,646,428 B1* | 5/2017 | Konrardy | G06Q 10/0635 |
| 9,720,412 B1 | 8/2017 | Zhu et al. | |
| 9,811,760 B2 | 11/2017 | Richardson et al. | |
| 9,914,452 B1* | 3/2018 | Ferguson | B60W 60/0027 |
| 10,012,981 B2* | 7/2018 | Gariepy | G05D 1/223 |
| 10,062,294 B2 | 8/2018 | Kunzi et al. | |
| 10,156,848 B1 | 12/2018 | Konrardy et al. | |
| 10,235,882 B1 | 3/2019 | Aoude et al. | |
| 10,248,120 B1 | 4/2019 | Siegel et al. | |
| 10,386,856 B2 | 8/2019 | Wood et al. | |
| 10,467,891 B1 | 11/2019 | Bart et al. | |
| 10,518,770 B2* | 12/2019 | Kroop | B60W 60/0011 |
| 10,518,783 B2* | 12/2019 | Tanimichi | G08G 1/16 |
| 10,540,892 B1 | 1/2020 | Fields et al. | |
| 10,558,224 B1* | 2/2020 | Lin | G05D 1/0285 |
| 10,564,641 B2 | 2/2020 | Vozar et al. | |
| 10,564,643 B2* | 2/2020 | Lui | G05D 1/0219 |
| 10,571,916 B2* | 2/2020 | Tschanz | G05D 1/0088 |
| 10,586,254 B2 | 3/2020 | Singhal | |
| 10,599,155 B1* | 3/2020 | Konrardy | G06N 3/088 |
| 10,614,709 B2 | 4/2020 | Vozar et al. | |
| 10,642,276 B2 | 5/2020 | Huai | |
| 10,654,476 B2* | 5/2020 | Wray | G08G 1/166 |
| 10,671,076 B1 | 6/2020 | Kobilarov et al. | |
| 10,717,445 B2* | 7/2020 | Michalakis | G05D 1/0088 |
| 10,761,542 B1* | 9/2020 | Fairfield | G05D 1/0027 |
| 10,796,581 B2 | 10/2020 | Herbach et al. | |
| 10,860,019 B2* | 12/2020 | Censi | G05D 1/0257 |
| 10,969,470 B2 | 4/2021 | Voorheis et al. | |
| 11,003,916 B2 | 5/2021 | Hummelshøj | |
| 11,086,318 B1* | 8/2021 | Davis | G05D 1/0212 |
| 11,087,200 B2* | 8/2021 | Olson | H04N 1/00002 |
| 11,215,982 B2* | 1/2022 | Urano | G05D 1/0011 |
| 11,242,054 B2* | 2/2022 | Isele | B60W 30/16 |
| 11,260,855 B2* | 3/2022 | Zhang | B60W 30/095 |
| 11,269,332 B2 | 3/2022 | Vozar et al. | |
| 11,281,213 B2 | 3/2022 | Cross et al. | |
| 11,300,957 B2* | 4/2022 | Wray | G05D 1/0088 |
| 11,352,023 B2 | 6/2022 | Fairley et al. | |
| 11,396,302 B2* | 7/2022 | Ye | B60W 50/029 |
| 11,472,436 B1 | 10/2022 | Patel et al. | |
| 11,472,444 B2 | 10/2022 | Goeddel et al. | |
| 11,565,717 B2 | 1/2023 | Kothbauer et al. | |
| 11,748,085 B2 | 9/2023 | Fields et al. | |
| 11,780,466 B1* | 10/2023 | Shah | B60W 60/00276 701/23 |
| 2002/0062207 A1 | 5/2002 | Faghri | |
| 2004/0100563 A1 | 5/2004 | Sablak et al. | |
| 2005/0004723 A1 | 1/2005 | Duggan et al. | |
| 2006/0184275 A1 | 8/2006 | Hosokawa et al. | |
| 2006/0200333 A1 | 9/2006 | Dalal et al. | |
| 2007/0193798 A1 | 8/2007 | Allard et al. | |
| 2007/0276600 A1 | 11/2007 | King et al. | |
| 2008/0033684 A1 | 2/2008 | Vian et al. | |
| 2010/0114554 A1 | 5/2010 | Misra | |
| 2010/0204867 A1 | 8/2010 | Longstaff | |
| 2011/0142283 A1 | 6/2011 | Huang et al. | |
| 2012/0089275 A1 | 4/2012 | Yao-Chang et al. | |
| 2013/0054106 A1* | 2/2013 | Schmudderich | G01S 13/931 701/1 |
| 2013/0141576 A1 | 6/2013 | Lord et al. | |
| 2013/0253816 A1 | 9/2013 | Caminiti et al. | |
| 2014/0195138 A1 | 7/2014 | Stelzig et al. | |
| 2014/0244198 A1 | 8/2014 | Mayer | |
| 2014/0309815 A1 | 10/2014 | Ricci et al. | |
| 2015/0105961 A1 | 4/2015 | Callow | |
| 2015/0284010 A1 | 10/2015 | Beardsley et al. | |
| 2015/0302756 A1 | 10/2015 | Guehring et al. | |
| 2015/0316928 A1 | 11/2015 | Guehring et al. | |
| 2015/0321337 A1 | 11/2015 | Stephens | |
| 2015/0344030 A1* | 12/2015 | Damerow | G06V 20/588 701/1 |
| 2016/0005333 A1 | 1/2016 | Naouri | |
| 2016/0209840 A1 | 7/2016 | Kim | |
| 2016/0314224 A1 | 10/2016 | Wei et al. | |
| 2016/0334230 A1* | 11/2016 | Ross | G05D 1/0027 |
| 2017/0031361 A1 | 2/2017 | Olson et al. | |
| 2017/0032671 A1 | 2/2017 | Toyama et al. | |
| 2017/0072853 A1 | 3/2017 | Matsuoka et al. | |
| 2017/0123419 A1 | 5/2017 | Levinson et al. | |
| 2017/0155696 A1 | 6/2017 | Dong et al. | |
| 2017/0192426 A1 | 7/2017 | Rust | |
| 2017/0199523 A1 | 7/2017 | Barton-Sweeney et al. | |
| 2017/0268896 A1 | 9/2017 | Bai et al. | |
| 2017/0289341 A1 | 10/2017 | Rodriguez et al. | |
| 2017/0291560 A1 | 10/2017 | Schroeder et al. | |
| 2017/0301111 A1 | 10/2017 | Zhao et al. | |
| 2017/0320500 A1* | 11/2017 | Yoo | B60W 30/0956 |
| 2017/0323568 A1 | 11/2017 | Inoue et al. | |
| 2017/0356748 A1 | 12/2017 | Iagnemma | |
| 2018/0011485 A1 | 1/2018 | Ferren | |
| 2018/0046182 A1 | 2/2018 | Joyce et al. | |
| 2018/0047291 A1 | 2/2018 | Konishi et al. | |
| 2018/0053102 A1 | 2/2018 | Martinson et al. | |
| 2018/0065625 A1 | 3/2018 | Tijerina et al. | |
| 2018/0070056 A1 | 3/2018 | Deangelis et al. | |
| 2018/0082596 A1 | 3/2018 | Whitlow | |
| 2018/0089563 A1* | 3/2018 | Redding | G06N 5/01 |
| 2018/0100743 A1* | 4/2018 | Diaz | G01C 21/3415 |
| 2018/0136651 A1* | 5/2018 | Levinson | G05D 1/0027 |
| 2018/0183873 A1 | 6/2018 | Wang et al. | |
| 2018/0184352 A1 | 6/2018 | Lopes et al. | |
| 2018/0196427 A1 | 7/2018 | Majumdar et al. | |
| 2018/0220283 A1 | 8/2018 | Condeixa et al. | |
| 2018/0224851 A1 | 8/2018 | Park | |
| 2018/0251126 A1 | 9/2018 | Linscott et al. | |
| 2018/0267550 A1 | 9/2018 | Kopetz et al. | |
| 2018/0268281 A1 | 9/2018 | Olson et al. | |
| 2018/0293537 A1 | 10/2018 | Kwok | |
| 2018/0299898 A1* | 10/2018 | Luo | B60W 30/143 |
| 2018/0330481 A1 | 11/2018 | Watanabe et al. | |
| 2018/0365908 A1 | 12/2018 | Liu et al. | |
| 2018/0367997 A1 | 12/2018 | Shaw et al. | |
| 2019/0027034 A1 | 1/2019 | Xu et al. | |
| 2019/0039545 A1* | 2/2019 | Kumar | G05D 1/228 |
| 2019/0042859 A1 | 2/2019 | Schubert et al. | |
| 2019/0066399 A1 | 2/2019 | Jiang et al. | |
| 2019/0096244 A1* | 3/2019 | Guruva Reddiar | G08G 1/096741 |
| 2019/0101914 A1 | 4/2019 | Coleman et al. | |
| 2019/0101919 A1 | 4/2019 | Kobilarov et al. | |
| 2019/0106117 A1 | 4/2019 | Goldberg | |
| 2019/0113919 A1 | 4/2019 | England et al. | |
| 2019/0113929 A1* | 4/2019 | Mukadam | G08G 1/167 |
| 2019/0130878 A1 | 5/2019 | Bradley | |
| 2019/0138524 A1 | 5/2019 | Singh et al. | |
| 2019/0147610 A1 | 5/2019 | Frossard et al. | |
| 2019/0163176 A1 | 5/2019 | Wang et al. | |
| 2019/0180529 A1 | 6/2019 | Smith | |
| 2019/0188493 A1* | 6/2019 | Tiziani | G05D 1/0214 |
| 2019/0196465 A1 | 6/2019 | Hummelshøj | |
| 2019/0220011 A1 | 7/2019 | Della Penna | |
| 2019/0227553 A1 | 7/2019 | Kentley-Klay et al. | |

(56) References Cited

U.S. PATENT DOCUMENTS

| | | | |
|---|---|---|---|
| 2019/0235516 A1 | 8/2019 | Zhang et al. | |
| 2019/0236950 A1 | 8/2019 | Li et al. | |
| 2019/0258246 A1* | 8/2019 | Liu | G05D 1/0038 |
| 2019/0258251 A1 | 8/2019 | Ditty et al. | |
| 2019/0265059 A1 | 8/2019 | Warnick et al. | |
| 2019/0271554 A1 | 9/2019 | Colgate et al. | |
| 2019/0271981 A1 | 9/2019 | Oba | |
| 2019/0291726 A1 | 9/2019 | Shalev-Shwartz et al. | |
| 2019/0329771 A1* | 10/2019 | Wray | B60W 30/18154 |
| 2019/0331758 A1 | 10/2019 | Malkes et al. | |
| 2019/0332106 A1* | 10/2019 | Belloni Mourao | B60W 40/08 |
| 2019/0337509 A1 | 11/2019 | Shalev-Shwartz et al. | |
| 2020/0004241 A1* | 1/2020 | Levinson | G05D 1/0044 |
| 2020/0017114 A1 | 1/2020 | Santoni et al. | |
| 2020/0020226 A1 | 1/2020 | Stenneth et al. | |
| 2020/0026286 A1 | 1/2020 | Vozar et al. | |
| 2020/0057441 A1 | 2/2020 | Wang et al. | |
| 2020/0086837 A1 | 3/2020 | Le Cornec | |
| 2020/0094850 A1 | 3/2020 | Chi et al. | |
| 2020/0097003 A1* | 3/2020 | Wray | G08G 1/096775 |
| 2020/0098269 A1 | 3/2020 | Wray et al. | |
| 2020/0110411 A1 | 4/2020 | Vozar et al. | |
| 2020/0122830 A1 | 4/2020 | Anderson et al. | |
| 2020/0124447 A1 | 4/2020 | Schwindt et al. | |
| 2020/0150661 A1 | 5/2020 | Vozar et al. | |
| 2020/0159227 A1 | 5/2020 | Cohen et al. | |
| 2020/0189731 A1 | 6/2020 | Mistry et al. | |
| 2020/0209846 A1 | 7/2020 | Chen | |
| 2020/0209853 A1 | 7/2020 | Leach et al. | |
| 2020/0209864 A1* | 7/2020 | Chen | G01C 21/3811 |
| 2020/0233060 A1 | 7/2020 | Lull et al. | |
| 2020/0255027 A1 | 8/2020 | Kulkarni et al. | |
| 2020/0269843 A1* | 8/2020 | Wissing | B60W 30/18163 |
| 2020/0290619 A1* | 9/2020 | Mehdi | B60W 40/04 |
| 2020/0293038 A1 | 9/2020 | Laurent et al. | |
| 2020/0293041 A1 | 9/2020 | Palanisamy | |
| 2020/0294401 A1 | 9/2020 | Kerecsen | |
| 2020/0309543 A1 | 10/2020 | Voznesensky | |
| 2020/0310417 A1 | 10/2020 | Pedersen et al. | |
| 2020/0339151 A1 | 10/2020 | Batts et al. | |
| 2020/0346666 A1 | 11/2020 | Wray et al. | |
| 2020/0355820 A1 | 11/2020 | Zeng et al. | |
| 2020/0369294 A1 | 11/2020 | Jeon et al. | |
| 2020/0379457 A1 | 12/2020 | Ostafew et al. | |
| 2020/0400781 A1 | 12/2020 | Voorheis et al. | |
| 2020/0401135 A1 | 12/2020 | Chen et al. | |
| 2021/0018916 A1 | 1/2021 | Thakur et al. | |
| 2021/0042535 A1 | 2/2021 | Abbott et al. | |
| 2021/0116907 A1* | 4/2021 | Altman | B60W 60/0015 |
| 2021/0132606 A1 | 5/2021 | Basich et al. | |
| 2021/0163021 A1 | 6/2021 | Frazzoli et al. | |
| 2021/0181758 A1 | 6/2021 | Das et al. | |
| 2021/0197864 A1 | 7/2021 | Oltmann et al. | |
| 2021/0208244 A1 | 7/2021 | Voorheis et al. | |
| 2021/0229697 A1* | 7/2021 | Lee | B60W 30/08 |
| 2021/0237759 A1 | 8/2021 | Wray et al. | |
| 2021/0245785 A1* | 8/2021 | Suzuki | B60W 50/08 |
| 2021/0269063 A1 | 9/2021 | Lee et al. | |
| 2021/0286651 A1* | 9/2021 | Ho | G06F 3/0647 |
| 2021/0323573 A1* | 10/2021 | Gogna | G01C 21/3407 |
| 2021/0339741 A1 | 11/2021 | Rezvan Behbahani et al. | |
| 2021/0365701 A1* | 11/2021 | Eshet | G01C 21/3848 |
| 2022/0066440 A1 | 3/2022 | Sucan et al. | |
| 2022/0073097 A1 | 3/2022 | Sucan et al. | |
| 2022/0076032 A1 | 3/2022 | Jain et al. | |
| 2022/0081005 A1* | 3/2022 | Brown | G08G 1/162 |
| 2022/0126878 A1* | 4/2022 | Moustafa | G08G 1/096741 |
| 2022/0185325 A1 | 6/2022 | Chen et al. | |
| 2022/0194419 A1* | 6/2022 | Houshmand | B60W 60/0023 |
| 2022/0204010 A1* | 6/2022 | Zhu | B60W 40/09 |
| 2022/0227389 A1 | 7/2022 | Tam | |
| 2022/0348222 A1 | 11/2022 | Zhao et al. | |
| 2022/0348223 A1 | 11/2022 | Zhao et al. | |
| 2023/0060435 A1* | 3/2023 | Funke | G05D 1/225 |
| 2023/0067887 A1 | 3/2023 | Garg et al. | |
| 2023/0166764 A1* | 6/2023 | Johnson | B60W 30/095 701/23 |
| 2023/0174103 A1* | 6/2023 | Patel | B60W 60/00276 701/23 |
| 2023/0176573 A1* | 6/2023 | Kumavat | G05D 1/0038 701/23 |
| 2023/0185300 A1* | 6/2023 | Wray | B60W 30/04 701/27 |
| 2023/0192134 A1 | 6/2023 | Winter et al. | |
| 2023/0194286 A1* | 6/2023 | Winter | G01C 21/3407 |
| 2023/0256991 A1* | 8/2023 | Johnson | B60W 60/001 |

FOREIGN PATENT DOCUMENTS

| | | |
|---|---|---|
| JP | 2016091039 A | 5/2016 |
| JP | 2016184276 A | 10/2016 |
| JP | 2019185279 A | 10/2019 |
| WO | 2015160900 A1 | 10/2015 |
| WO | 2020264144 A1 | 12/2020 |

OTHER PUBLICATIONS

Mehta, D., et al., "Autonomous Navigation in Dynamic Social Environments Using Multi-Policy Decision Making", Proceedings of the IEEE/RSJ International Conference on Intelligent Robots and Systems (IROS) (2016).

Mehta, D., et al., "Fast Discovery of Influential Outcomes For Risk-Aware MPDM", Proceedings go the IEEE International Conference on Robotics and Automation (ICRA) (2017).

Neumeier Stefan, et al., "Towards a Driver Support System for Teleoperated Driving", 2019 IEEE Intelligent Transportation Systems Conference (ITSC) (Year: 2019).

Paden, B., et al., "A Survey of Motion Planning and Control Techniques for Self-driving Urban Vehicles", IEEE Transactions on Intelligent Vehicles, vol. 1, Ids. 1, (Jun. 13, 2016).

Straub, J., "Comparing The Effect Of Pruning On A Best Path and a Naive-approach Blackboard Solver", International Journal of Automation and Computing (Oct. 2015).

Wuthishuwong, Chairit, et al., "Vehicle to Infrastructure based Safe Trajectory Planning for Autonomous Intersection Management", 2013 13th International Conference on ITS Telecommunications (ITST) (Year: 2013).

Crossman, Jacob, et al., "Method and System for Assessing and Mitigating Risks Encounterable by an Autonomous Vehicle", U.S. Appl. No. 18/538,312, filed Dec. 13, 2023.

\* cited by examiner

METHOD AND SYSTEM FOR REMOTE ASSISTANCE OF AN AUTONOMOUS AGENT

CROSS REFERENCE TO RELATED APPLICATIONS

This application is a continuation of U.S. patent application Ser. No. 17/826,655, filed 27 May 2022, which claims the benefit of U.S. Provisional Application No. 63/195,774, filed 2 Jun. 2021, each of which is incorporated herein in its entirety by this reference.

TECHNICAL FIELD

This invention relates generally to the autonomous vehicle field, and more specifically to a new and useful system and method for remote assistance of an autonomous agent in the autonomous vehicle field.

BACKGROUND

In current systems and methods associated with autonomous vehicles, the usefulness of teleoperators in taking over control of the vehicle in risky and/or otherwise challenging scenarios has been recognized. However, in these cases, perfect communication is required between the vehicle and the teleoperator-a requirement which is extremely complex, if not impossible, to reliably establish. For autonomous vehicle systems and methods which do not employ teleoperators, either a human operator is conventionally required to be onboard or the autonomous vehicle must be trained to reliably understand and react to even the rarest of circumstances.

Thus, there is a need in the autonomous vehicle field to create an improved and useful system and method for receiving remote assistance from a teleoperator.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
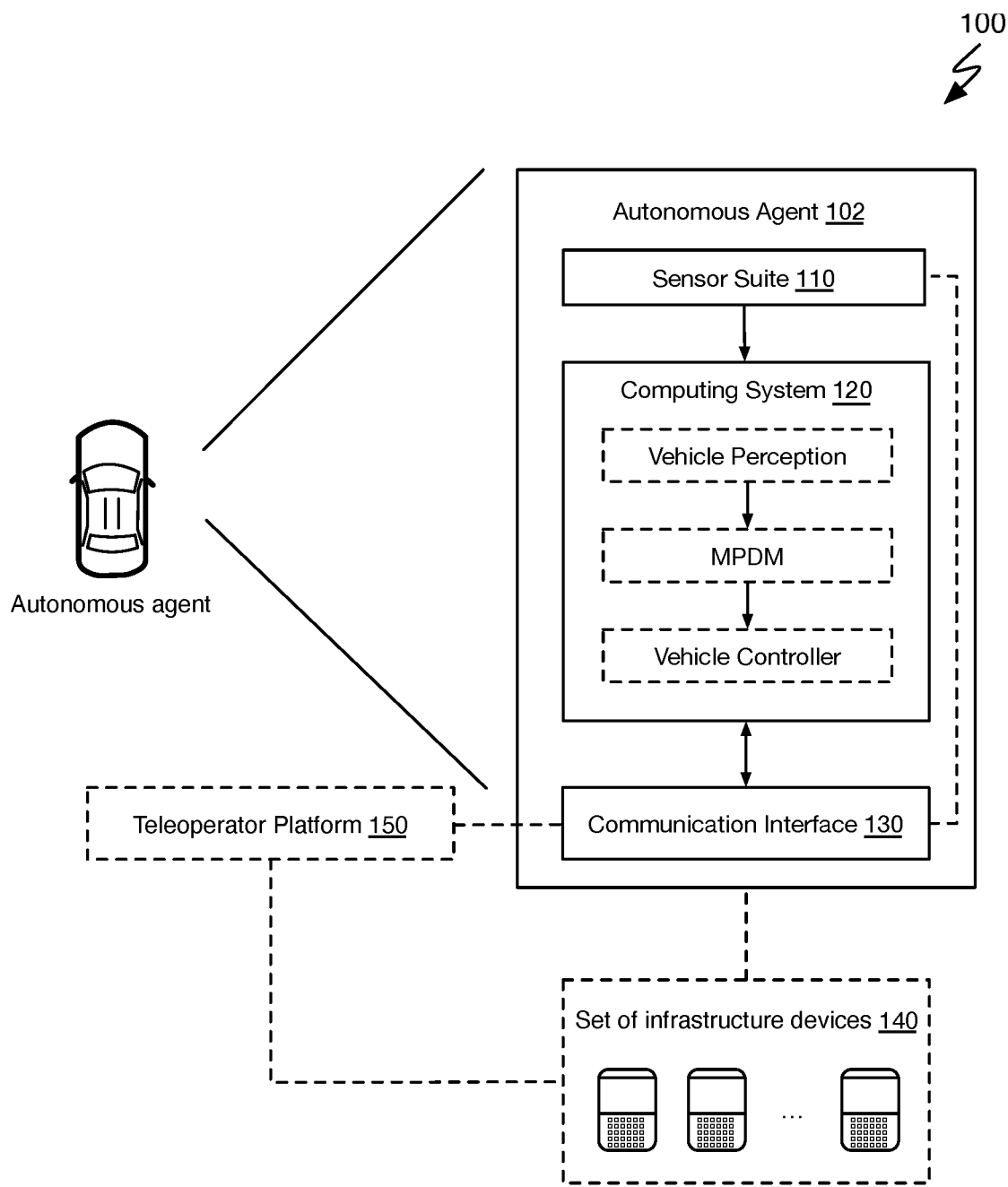
FIG. 1 is a schematic of a system for remote assistance of an autonomous agent.

The system 100 for remote assistance of an autonomous agent, an example of which is shown in FIG. 1, can include and/or interface with any or all of: a sensor suite 110, a computing system 120, a communication interface 130, and/or any other suitable components. The system can further optionally include a set of infrastructure devices 140, a teleoperator platform 150, and/or any other suitable components. The system 100 functions to enable information to be exchanged between an autonomous agent and a tele-assist platform (equivalently referred to herein as a teleoperator platform). Additionally or alternatively, the system 100 can function to operate the autonomous agent (e.g., based on remote inputs received from a teleoperator, indirectly, etc.) and/or can perform any other suitable functions. Additionally or alternatively, the system can function to facilitate execution of the method 200.

Additionally or alternatively, the system can include or all of the components as described in U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; and U.S. application Ser. No. 17/712,757, filed 4 Apr. 2022, each of which is incorporated herein in its entirety by this reference.

The system 100 is preferably used to perform any or all of the method 200, but can additionally or alternatively be used to perform any other methods and/or processes.

Figure 2:
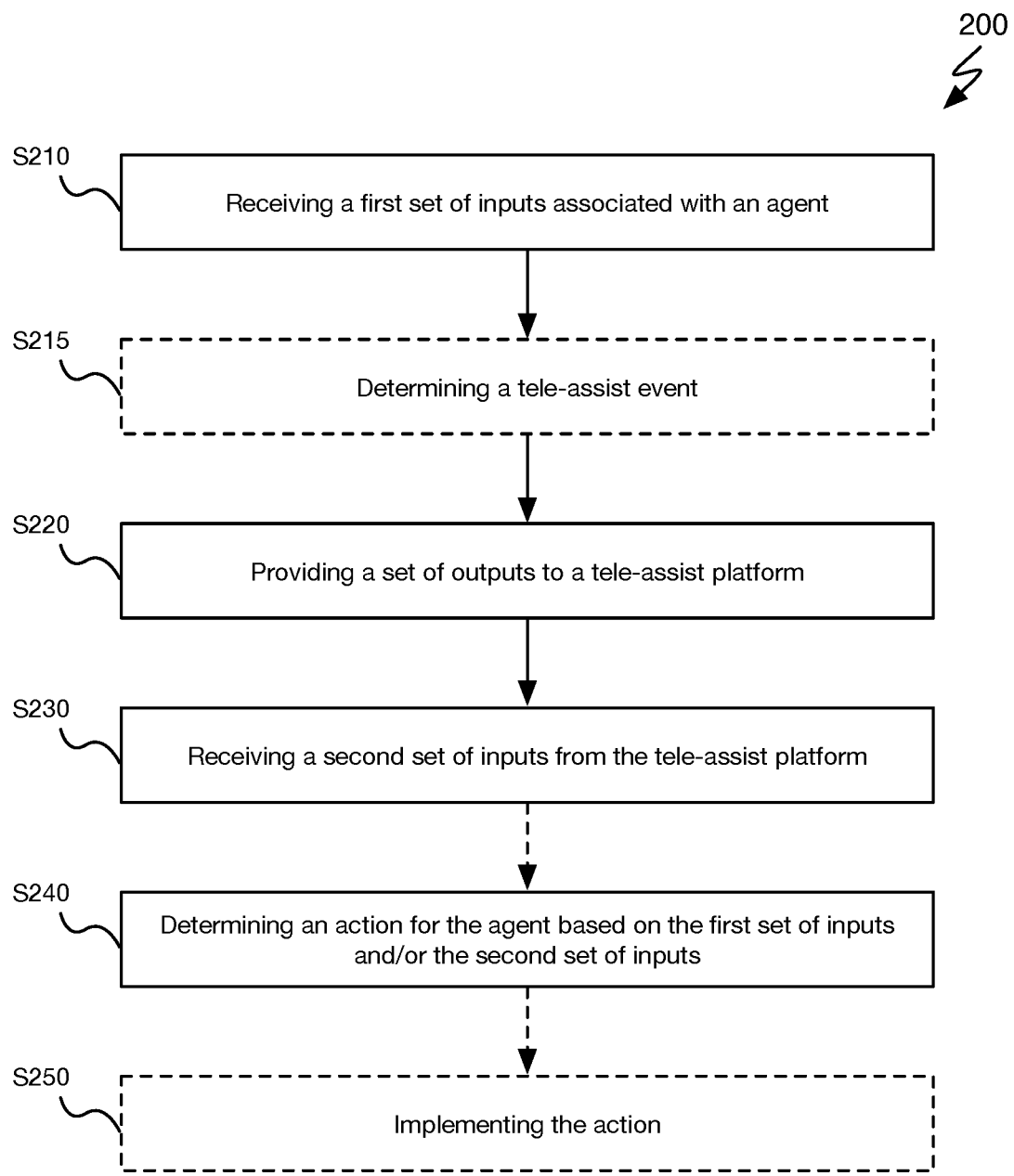
FIG. 2 is a schematic of a method for remote assistance of an autonomous agent.

As shown in FIG. 2, a method 200 for remote assistance of an autonomous agent can include any or all of: receiving a first set of inputs associated with an autonomous agent S210; optionally determining a tele-assist event S215; providing a set of outputs to a tele-assist platform S220; receiving a second set of inputs from the tele-assist platform S230; determining an action for the agent based on the first set of inputs and/or the second set of inputs S240; and optionally implementing the action S250. Additionally or alternatively, the method 200 can include any or all of the processes described in any or all of: U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; and U.S. application Ser. No. 17/712,757, filed 4 Apr. 2022, each of which is incorporated herein in its entirety by this reference, or any other suitable processes performed in any suitable order.

The method 200 can be performed with a system as described above and/or any other suitable system.

2. Benefits

The system and method for remote assistance of an autonomous agent can confer several benefits over current systems and methods.

First, variations of this technology can confer the benefit of interfacing with a human teleoperator to ease the burden of perfect classification (e.g., in edge cases) by the computing system of the autonomous agent. In specific examples, for instance, the human teleoperator can provide remote input related to policies available for consideration by a computing system of the autonomous agent. In specific examples, the teleoperator is utilized to effectively expand an operational design domain of the autonomous agent (e.g., where an onboard computer of the vehicle remains the ultimate decision-maker) rather than directly operate the autonomous agent. This can in turn function to reduce the criticality of having a perfectly low latency communication system between the agent and the teleoperator. Additionally or alternatively, the teleoperator can take part in direct operation of the autonomous agent and/or be otherwise utilized.

Second, variations of this technology can confer the benefit of reducing/minimizing an amount of training required for the autonomous agent, since the system can utilize remote input from the teleoperator in rare (e.g., edge case) scenarios, rather than needing to train the agent to be able to respond to all scenarios.

Third, variations of this technology can facilitate an autonomous vehicle overcoming or circumventing an impasse (e.g., getting the vehicle "unstuck" from a holding pattern where the vehicle cannot make progress) along a target vehicle path. For example, variants can facilitate provision of a tele-operator authorization to temporarily cross a solid white, yellow, or double yellow lane line to avoid an obstruction along a target vehicle path; drive into a lane associated with opposing traffic; and/or authorize a temporary suspension of nominal driving rules/procedures (e.g., at the direction of a traffic worker, in an edge case event, etc.).

Fourth, variations of this technology can facilitate notification-based and/or discretized (non-continuous) tele-operation of autonomous vehicles, which may allow a single tele-operator to facilitate operation of a plurality of autonomous vehicles (e.g., 1:N relationship between tele-operators and autonomous vehicles, where N is greater than 1), which may reduce the burden and/or labor cost associated with remote vehicle operation.

Additionally or alternatively, the system and method can confer any other benefit.

3. System

The system 100 for remote assistance of an autonomous agent, an example of which is shown in FIG. 1, can include and/or interface with any or all of: a sensor suite 110, a computing system 120, a communication interface 130, and/or any other suitable components. The system can further optionally include a set of infrastructure devices 140, a teleoperator platform 150, and/or any other suitable components. The system 100 functions to enable information to be exchanged between an autonomous agent and a tele-assist platform (equivalently referred to herein as a teleoperator platform). Additionally or alternatively, the system 100 can function to operate the autonomous agent (e.g., based on remote inputs received from a teleoperator, indirectly, etc.) and/or can perform any other suitable functions. Additionally or alternatively, the system can function to facilitate execution of the method 200.

A system 100 for remote assistance of an autonomous agent can include and/or interface with an autonomous operating system and an autonomous agent 102. Additionally or alternatively, the system can include or all of the components as described in U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/540,836, filed 14 Aug. 2019; and U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; and U.S. application Ser. No. 17/712,757, filed 4 Apr. 2022, each of which is incorporated herein in its entirety by this reference.

3.1 System—Components

The system 100 preferably includes and/or interfaces with (e.g., is integrated within) an autonomous vehicle (equivalently referred to herein as an autonomous agent, agent, and/or ego agent). The autonomous agent is preferably an autonomous vehicle, further preferably a fully autonomous vehicle and/or a vehicle able to be operated as a fully autonomous vehicle, but can additionally or alternatively be a semi-autonomous vehicle and/or any other vehicle.

Additionally, or alternatively, the autonomous agent can be a vehicle that switches between a semi-autonomous state and a fully autonomous state (or a fully-manned state) and thus, the autonomous agent can have attributes of both a semi-autonomous vehicle and a fully autonomous vehicle depending on the state of the autonomous agent.

In preferred variations, the autonomous vehicle is an automobile (e.g., car, driverless car, bus, shuttle, taxi, rideshare vehicle, truck, semi-truck, etc.). Additionally or alternatively, the autonomous vehicle can include any or all of: a watercraft (e.g., boat, water taxi, etc.), aerial vehicle (e.g., plane, helicopter, drone, VTOL aircraft, etc.), terrestrial vehicle (e.g., 2-wheeled vehicle, bike, motorcycle, scooter, etc.), and/or any other suitable vehicle and/or transportation device, autonomous machine, autonomous device, autonomous robot, and/or any other suitable device.

The system can include or interface with a sensor suite 110 (equivalently referred to herein as a sensor system) which functions to collect inputs for the computing system which can be used to determine one or more trajectories for the autonomous agent, and/or can function to execute Block S210 and/or any other Blocks of the method. Additionally or alternatively, the sensor suite can function to enable the autonomous agent operations (e.g., autonomous driving, maneuvering the autonomous vehicle along a trajectory, etc.), data capture regarding the circumstances surrounding the autonomous agent, data capture relating to operations of the autonomous agent, detecting maintenance needs (e.g., through engine diagnostic sensors, exterior pressure sensor strips, sensor health sensors, etc.) of the autonomous agent, detecting cleanliness standards of autonomous agent interiors (e.g., internal cameras, ammonia sensors, methane sensors, alcohol vapor sensors), and/or perform any other suitable functions.

The sensor suite (equivalently referred to herein as a sensor system) can include vehicle sensors onboard the autonomous agent, such as any or all of: inertial sensors (e.g., accelerometers, gyroscopes, magnetometer, IMU, INS, etc.), external antennas (e.g., GPS, cellular, Bluetooth, Wi-Fi, Near Field Communication, etc.), diagnostic sensors (e.g., engine load, tire pressure, temperature sensors, etc.), vehicle movement sensors (e.g., inertial sensors, wheel-speed sensors, encoders, resolvers, etc.), environmental sensors (e.g., cameras, time-of-flight sensors, temperature sensors, wind speed/direction sensors, barometers, etc.), guidance sensors (e.g., LIDAR, Radar, sonar, cameras, etc.), computer vision (CV) sensors, cameras (e.g., stereo camera, hyperspectral, multi-spectral, video camera, wide-angle, CMOS, CCD, etc.), time-of-flight sensors (e.g., Radar, Lidar, sonar, etc.), and/or any other suitable sensors. The sensor suite preferably includes sensors onboard the autonomous vehicle (e.g., Radar sensors and/or Lidar sensors and/or cameras coupled to an exterior surface of the agent, IMUs and/or encoders coupled to and/or arranged within the agent, etc.), but can additionally or alternatively include sensors remote from the agent (e.g., as part of one or more infrastructure devices, sensors in communication with the agent, etc.), and/or any suitable sensors at any suitable locations.

However, the sensor suite can include any other suitable set of sensors, and/or can be otherwise suitably configured.

The autonomous agent preferably includes and/or interfaces with a computing system 120, wherein the computing system functions to process information (e.g., sensor inputs) in order to determine a set of one or more trajectories for the vehicle. Additionally or alternatively, the computing system can function to perform any or all of the processes involved in any or all of: perception, prediction, localization, planning, control, and/or any other processes involved in operation of the autonomous agent.

The computing system preferably includes an onboard computing system arranged onboard (e.g., integrated within) the autonomous agent. Additionally or alternatively, the computing system can include any or all of: a remote computing system (e.g., cloud computing system, remote computing in communication with an onboard computing system, in place of an onboard computing system, etc.), a computing system integrated in a supplementary device (e.g., mobile device, user device, etc.), an edge device including mobile computing devices, and/or any other suitable computing systems and devices. In some variations, for instance, the autonomous agent is operable in communication with a remote or disparate computing system that may include a user device (e.g., a mobile phone, a laptop, etc.), a remote server, a cloud server, or any other suitable local and/or distributed computing system remote from the vehicle. The remote computing system can be connected to one or more systems of the autonomous agent through one or more data connections (e.g., channels), but can alternatively communicate with the vehicle system in any suitable manner.

The computing system preferably includes a processing system (e.g., graphical processing unit or GPU, central processing unit or CPU, or any suitable processing circuitry) and memory, but can additionally or alternatively include any other suitable components. The memory can be short term (e.g., volatile, non-volatile, random access memory or RAM, etc.) and/or long term (e.g., flash memory, hard disk, etc.) memory.

In some variations, for instance, the onboard computing system functions to interact with and/or operably control any one or more of the identified components or modules described herein. In preferred variations, for instance, the onboard computing system executes computer instructions for implementing a multi-policy decisioning module (MPDM), which implements an MPDM process. In specific examples, the processing system and memory collectively function to dynamically manage the set of policies available to the autonomous agent in the framework of a multi-policy decision making framework, such as that described in U.S. application Ser. No. 16/514,624, filed 17 Jul. 2019, and/or U.S. application Ser. No. 17/365,538, filed 1 Jul. 2021, each of which is incorporated herein in its entirety by this reference. Additionally or alternatively, the processing system and memory, and/or any other suitable components, can be used for any other suitable functions.

In specific examples, the system is configured to interface with and/or implement a multi-policy decision-making process (e.g., multi-policy decision-making task block of a computer-readable medium) of the ego agent and any associated components (e.g., computers, processors, software modules, etc.), wherein the multi-policy decision-making module of a computing system (e.g., onboard computing system) includes a simulator module (or similar machine or system) (e.g., simulator task block of a computer-readable medium) that functions to predict (e.g., estimate) the effects of future (i.e., steps forward in time) behavioral policies (operations or actions) implemented at the ego agent and optionally those at each of the set environmental agents (e.g., other vehicles in an environment of the ego agent) and/or objects (e.g., pedestrians) identified in an operating environment of the ego agent. The simulations can be based on a current state of each agent (e.g., the current hypotheses) and/or historical actions or historical behaviors of each of the agents derived from the historical data buffer (preferably including data up to a present moment). The simulations can further take into account a target path (equivalently referred to herein as a nominal path) which prescribes a desired routing of the vehicle (e.g., along a fixed route, along a non-fixed route, toward a destination, etc.), such that the simulations are performed in accordance with this target path. The simulations can provide data relating to interactions (e.g., relative positions, relative velocities, relative accelerations, etc.) between projected behavioral policies of each environmental agent and the one or more potential behavioral policies that may be executed by the autonomous agent. The data from the simulations can be used to determine (e.g., calculate) any number of metrics, which can individually and/or collectively function to assess any or all of: the potential impact of the ego agent on any or all of the environmental agents when executing a certain policy, the risk of executing a certain policy (e.g., collision risk), the extent to which executing a certain policy progresses the ego agent toward a certain goal, and/or determining any other metrics involved in selecting a policy for the ego agent to implement.

The set of metrics can optionally include and/or collectively determine (e.g., through aggregating any or all of the set of metrics described below) a cost function (and/or loss function) associated with each proposed ego agent policy based on the set of simulation(s) performed for that proposed policy. Additionally or alternatively, the set of metrics described below can be individually determined and/or analyzed, other metrics can be determined, the metrics can be aggregated in other suitable ways, and/or the metrics can be otherwise configured. With these metrics and/or functions, a best policy from the set of policies can be selected, such as by comparing the metrics and/or functions among the different proposed policies (e.g., and selecting the policy which has a lowest cost/loss function, selecting the policy which optimizes [e.g., maximizes, minimizes, etc.] an objective function, selecting a policy which minimizes risk and/or maximizes progress toward a goal/destination, etc.).

The computing system (e.g., onboard computing system) preferably functions to control the autonomous agent and process sensed data from a sensor system (equivalently referred to herein as a sensor suite) (e.g., a computer vision system, LIDAR, flash LIDAR, wheel speed sensors, GPS, etc.) of the autonomous agent and/or other sensors (e.g., from infrastructure devices) and/or information sources (e.g., a tele-assist platform) to determine states of the autonomous agent and/or states of objects (e.g., other vehicles/agents, pedestrians, cyclists, etc.) in an operating environment of the autonomous agent. Based on the states of the autonomous agent and/or objects (e.g., real objects, virtual objects, etc.) in the operating environment and/or any other information/instructions (e.g., programmed instructions, learned instructions, etc.), the onboard computing system—such as through a multi-policy decision-making module—can generate behavioral policies and select a behavioral policy (e.g., change lanes, merge, maintain current lane, turn left, turn right, pull over, slow down, speed up, stop at light, stop at stop sign, yield, etc.) that the computing system executes to control a behavior of the autonomous agent.

In a first set of variations, the computing system includes an onboard general-purpose computer adapted for I/O communication with vehicle control systems and sensor systems but may additionally or alternatively be any suitable computing device. The onboard computing system is preferably connected to the Internet via a wireless connection (e.g., via a cellular link or connection). Additionally, or alternatively, the onboard computing system can be coupled to any number of wireless or wired communication systems. The system can additionally include a second computing system or set of computing systems at a tele-assist platform and/or associated with a tele-assist platform (e.g., cloud-based computing system), wherein the onboard computing system and the tele-assist computing system are in communication as described below.

Additionally or alternatively, any other computing system(s) can be used.

The system 100 preferably includes a communication interface 130 in communication with the computing system, which functions to enable information to be received at (e.g., from infrastructure devices, from a remote computing system and/or remote server, from a teleoperator platform, from another autonomous agent or other vehicle, etc.) and transmitted from the computing system (e.g., to a remote computing system and/or remote server, to a teleoperator platform, to an infrastructure device, to another autonomous agent or other vehicle, etc.). The communication interface preferably includes a wireless communication system (e.g., Wi-Fi, Bluetooth, cellular 3G, cellular 4G, cellular 5G, multiple-input multiple-output or MIMO, one or more radios, or any other suitable wireless communication system or protocol), but can additionally or alternatively include any or all of: a wired communication system (e.g., modulated powerline data transfer, Ethernet, or any other suitable wired data communication system or protocol), a data transfer bus (e.g., CAN, FlexRay), and/or any other suitable components. In specific examples, for instance, the communication interface implements a communication protocol between the onboard computing system and a tele-assist platform (e.g., computing system of the tele-assist platform).

Figure 4:
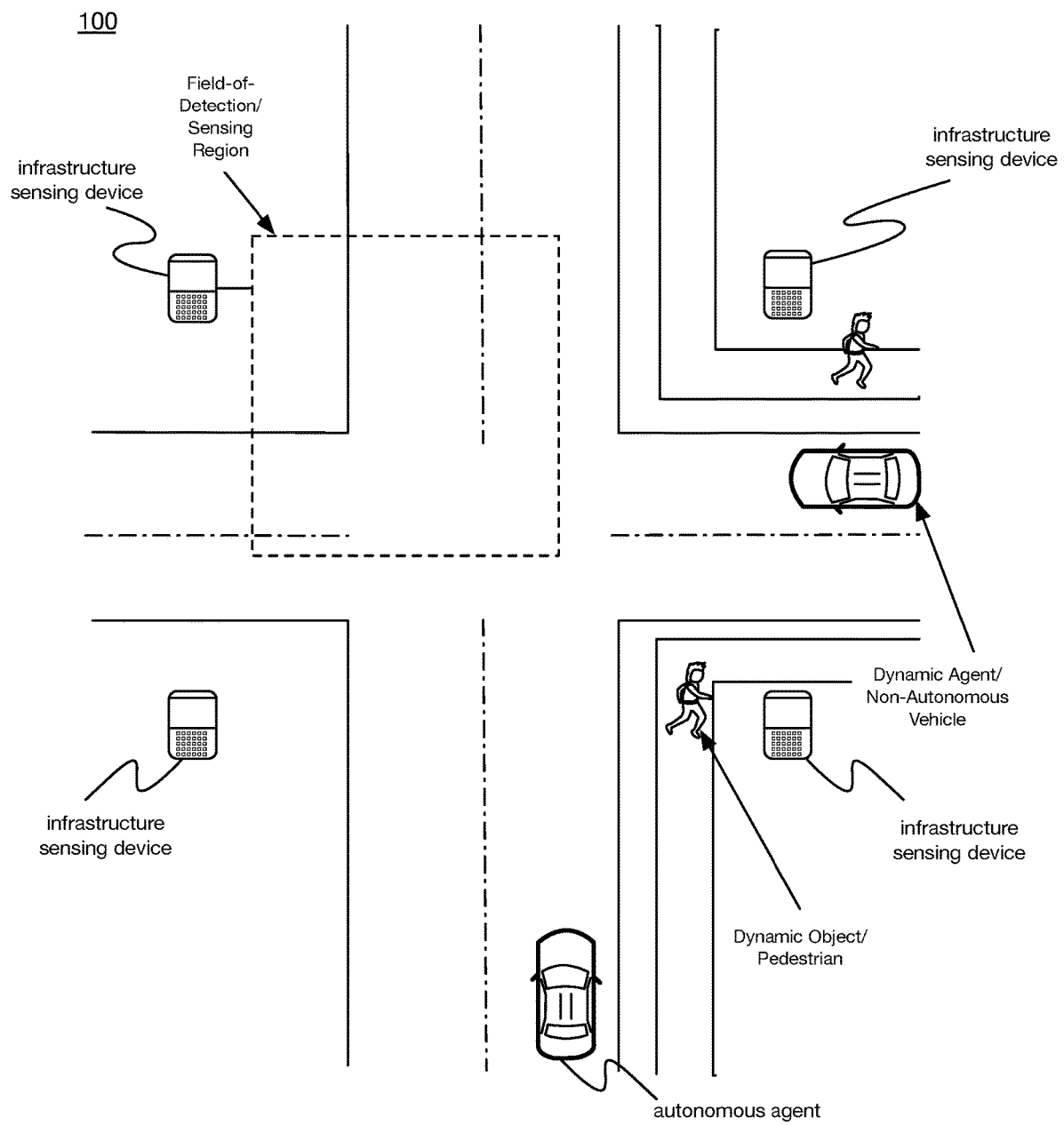
FIG. 4 depicts a schematic variation of the system for remote assistance of an autonomous agent.

The system 100 can optionally include a set of infrastructure devices 140 (e.g., as shown in FIG. 4), equivalently referred to herein as roadside units, which individually and/or collectively function to observe one or more aspects and/or features of an environment and collect observation data relating to the one or more aspects and/or features of the environment. The set of infrastructure devices are preferably in communication with an onboard computing system of the autonomous agent, but can additionally or alternatively be in communication with the tele-assist platform, any other components, and/or any combination.

In preferred variations, the infrastructure devices additionally function to collect data associated with the observations and transmit the collected data and/or processed derivatives of the collected data to the autonomous agent. Additionally or alternatively, the infrastructure devices can function to collect and transmit data to a teleoperator platform, wherein the teleoperators can use the data to inform decision making of a teleoperator, such as whether to include and/or exclude a behavioral policy from consideration by the computing system of the autonomous agent. In a specific example, for instance, an infrastructure device can enable a view around a corner of the vehicle to be seen, which the agent and/or an operator and/or a teleoperator of the agent can use to enable a turning behavioral policy to be considered by the autonomous agent (by seeing that the road is clear for a turn).

In a first variation, for instance, the infrastructure devices forward the collected observations data to an autonomous vehicle service and/or remote platform (e.g., implemented via a network of distributed computing systems), such as a tele-assist platform, that operates to interactively communicate with and/or control one or more functions of the autonomous agent.

The infrastructure devices preferably include devices in an immediate and/or close proximity or within short-range communication proximity to an operating position of an autonomous agent and can function to collect data regarding circumstances surrounding the autonomous agent and in areas proximate to a zone of operation of the autonomous agent. In some embodiments, the roadside units include one or more of offboard sensing devices including flash LIDAR, thermal imaging devices (thermal cameras), still or video capturing devices (e.g., image cameras and/or video cameras, etc.), global positioning systems, radar systems, microwave systems, inertial measuring units (IMUs), and/or any other suitable sensing devices or combination of sensing devices.

The infrastructure devices can optionally include computing capabilities via processing circuitry and a communication interface that enables the infrastructure devices to communicate with any or all of: a computing system of the autonomous agent, a remote computing system, a teleoperator platform, and/or any other suitable components or combination of components.

A technical benefit achieved by the implementation of the infrastructure devices can include an ability to observe circumstances (e.g., around corners, down perpendicular streets, etc.) beyond the observable scope of the autonomous agent, which can subsequently function in the curation of one or more behavioral policies available to the agent (e.g., and able to be considered by the agent in a multi-policy decision making [MPDM] module). At a given instance in time, for example, observations of one or more aspects of a given environment may be made by an autonomous agent and observations of one or more different and/or overlapping aspects of the given environment may be made from a different perspective by one or more infrastructure devices arranged and operating in the given environment. In such embodiments, the perspective of the infrastructure devices, including the observation data therefrom, may be augmented to observation data from the perspective of the autonomous agent to generate a comprehensive perspective of the operating environment of the autonomous agent and/or to provide an additional view to one or more teleoperators of a teleoperator platform. This can enable improved predictions of the operating environment to be made and improved behavioral policy decisions to be selected and/or executed by the autonomous agent for operating independently (of an onboard human operator) and safely within the operating environment.

In some variations, the autonomous agent can augment and/or fuse data derived by the onboard sensor suite with additional observations from the infrastructure devices (e.g., the roadside units) to improve policy curation and/or trajectory determination by the autonomous agent.

Additionally or alternatively, the infrastructure devices can detect and track any type or kind of objects in an operating environment, such as with a video camera or radar, and/or virtually inserted into an operating environment. In some variations, for instance, a video camera can function to provide detection of objects and semantic classification of the object type and possible intent of an object, such as a pedestrian that is about to cross a road, or a car that is about to make a left turn, a driver which is about to open a car door and exit their vehicle, a bicyclist operating in a bike lane, and/or any other suitable information.

Further additionally or alternatively, any or all of the infrastructure devices can include traffic management devices (e.g., traffic sensors, traffic lights, pedestrian lights, etc.) or the like operating in the environment that may function to communicate with any or all of: other infrastructure devices (e.g., roadside units); directly with the autonomous agent regarding any or all of: data collected and/or sensed by the infrastructure device, regarding an operating state of the infrastructure device (e.g., red or green traffic light), and/or any other information; directly with a teleoperator platform; and/or can communicate in any other suitable way. In a specific example, a traffic light can be an infrastructure device in an environment surrounding the autonomous vehicle that may function to communicate operating state information, such as a light color that the traffic light is projecting, or other information, such as a timing of the light changes by the traffic light, and/or the like.

Further additionally or alternatively, information from traffic management devices can be used to trigger a notification to a teleoperator, or alternatively, to prevent a trigger (e.g., a false positive) from being sent to a teleoperator. In specific examples, for instance, in an event that the vehicle is stopped for more than a threshold period of time—which could indicate that a teleoperator should be consulted—an indication that the vehicle is stopped at a red light based on a traffic management device can be used to prevent the request for assistance from being sent to the teleoperator. And alternatively, in an event that the vehicle is stopped for more than a threshold period of time and the light at which the vehicle is stopped is green, a request for assistance can be sent to the teleoperator.

The system can optionally include and/or interface with a vehicle control system including one or more controllers and/or control systems, which include any suitable software and/or hardware components (e.g., processor and computer-readable storage device) utilized for generating control signals for controlling the autonomous agent according to a routing goal of the autonomous agent and selected behavioral policies and/or a selected trajectory of the autonomous agent.

Additionally or alternatively, the vehicle control system can include, interface with, and/or communication with any or all of a set electronic modules of the agent, such as but not limited to, any or all of: electronic control units [ECUs], telematic control units [TCUs], transmission control modules [TCMs], antilock braking system [ABS] control module, body control module [BCM], and/or any other suitable control subsystems and/or modules.

In preferred variations, the vehicle control system includes, interfaces with, and/or implements a drive-by-wire system of the vehicle. Additionally or alternatively, the vehicle can be operated in accordance with the actuation of one or more mechanical components, and/or be otherwise implemented.

Additionally or alternatively, the system can include any or all of: a sensor fusion system, a positioning system (e.g., including location sensors of the sensor system), a guidance system, and/or any suitable components. In some variations, for instance, the sensor fusion system synthesizes and processes sensor data and together with a multi-policy decisioning module predicts the presence, location, classification, and/or path of objects and features of the environment of the autonomous agent (real or virtual). In various embodiments, the sensor fusion system may function to incorporate data from multiple sensors and/or data sources, including but not limited to cameras, LIDARS, radars, infrastructure devices, remote data feeds (Internet-based data feeds), and/or any number of other types of sensors.

The positioning system can process sensor data along with other data to determine a position (e.g., a local position relative to a map, an exact position relative to lane of a road, vehicle heading, velocity, etc.) of the autonomous agent relative to the environment, which can function to determine what behavioral policies are available to the autonomous agent (e.g., as described below). The guidance system can process sensor data along with other data to determine a path for the vehicle to follow.

The system preferably includes and/or interfaces with a tele-assist (teleoperator) platform 150, which refers to one or more remote teleoperators and associated components (e.g., communication interface with autonomous agent, computing system, output devices for displaying information from autonomous agents and/or infrastructure devices to teleoperators, input devices for receiving instructions/commands from teleoperators, etc.). The tele-assist platform can function to provide outputs to and receive inputs from one or more teleoperators, which can be used in the determination of the curated behavioral policies for the vehicle. In preferred variations, for instance, remote input from a teleoperator functions to effectively expand an operational design domain (ODD) associated with the vehicle by approving and/or proposing behavioral policies for the vehicle. In preferred specific examples, the behavioral policies approved and/or proposed by the teleoperator are still ultimately either selected or rejected by the computing system onboard the autonomous agent (e.g., a teleoperator may have no direct command/control authority over vehicle systems-such as braking, steering, execution of a trajectory, etc.). In a specific example implementing an MPDM module, for instance, a teleoperator can effectively approve behavioral policies for consideration by the onboard computing system, wherein the onboard computing system ultimately chooses the policy(ies) to implement (and plans/executes vehicle control instructions according to the policy decision). As such, in preferred examples, no commands for direct control of the agent are received from the teleoperator. This can have the benefit of allowing latency from the tele-assist platform to the onboard computing system to be a non-critical issue, as the teleoperator is not utilized for safety-critical tasks, but rather to supply context information to the onboard computing system, wherein the onboard computing system ultimately makes the driving decision. For example, teleoperator inputs (e.g., a teleoperator approved policy) can be received via a wireless connection (e.g., between the onboard computing system and the tele-assist platform) and/or implemented with a latency greater than 50 milliseconds, which can facilitate teleoperator intervention even in areas with poor wireless coverage/connectivity. However, the teleoperation latency can alternatively be less than 50 milliseconds and/or a human operator can optionally be present onboard the autonomous agent to quickly take control of the autonomous agent if needed.

Alternatively, any or all of the behavioral policies approved and/or proposed by the teleoperator can be automatically implemented, definitively implemented (e.g., overriding other behavioral policies), the teleoperator can have direct control of the vehicle, and/or teleoperator input can be otherwise implemented.

Teleoperators of the tele-assist platform can additionally or alternatively be used to monitor an interior of the autonomous agent, such as to view and/or communicate with (e.g., through audio) riders/passengers inside of a vehicle cabin. In some variations, for instance, a teleoperator can be used to ensure that riders are seated and/or belted before the vehicle moves, communicate with passengers to provide them with instructions, and/or perform any other functions.

As described above, the system preferably includes and/or interfaces with a multi-policy decision-making (MPDM) module. In a preferred set of variations of an MPDM module, the MPDM module includes a simulator or similar machine or system that functions to estimate future (i.e., steps forward in time) behavioral policies (operations or actions) for each of the agents identified in an operating environment of the autonomous agent (e.g., other vehicles on the road, bikers, pedestrians, etc.) including potential behavioral policies that may be executed by the autonomous agent, such as described in any or all of: U.S. application Ser. No. 15/923,577, filed 16 Mar. 2018, and U.S. application Ser. No. 16/514,624, filed 17 Jul. 2019, each of which is incorporated in its entirety by this reference. The simulations may be based on a current state of each agent (e.g., the current hypotheses), historical actions or historical behaviors of each of the agents derived from the historical data buffer (preferably including data up to a present moment), and/or any combination, or other information. The simulations can provide data relating to interactions (e.g., relative positions, relative velocities, relative accelerations, etc.) between projected behavioral policies of each agent and the one or more potential behavioral policies that may be executed by the autonomous agent. The MPDM module can then select one of the plurality of behavioral policies based on one or more predetermined or dynamic selection criteria. The selection criteria can be based on any suitable behavioral policy selection factors that may be delineated in advance of operating the autonomous agent or dynamically based on one or more features relating to an operating environment or operating mode of the autonomous agent. For instance, the selection criteria can be predetermined and/or set such that the autonomous agent functions to select the behavioral policy with a highest probability of being executed safely. In another example, if an operating circumstance of the autonomous vehicle includes an emergency situation, the selection criteria can be dynamic and set such that the computing system selects a behavioral policy from the tractable set of behavioral policies that requires a (weighted) balance between efficiency in operation and safety or the like. Additionally or alternatively, a policy can be selected to delimit the potential behavioral policies for execution by the autonomous agent based on one or more predetermined thresholds relating to probabilities of execution by the autonomous agent. That is, in some embodiments, the MPDM module can in theory generate hundreds if not thousands of simulations resulting in hundreds or thousands of potential behavioral policies for execution by the autonomous agent in a given circumstance. As such, the MPDM module can function to identify only a subset of those generated behavioral policies according to predetermined threshold identifying one or more minimum probability values for safely executing an action or an operation by the autonomous agent or one or more minimum probabilities value for successfully executing an operation or an action by the autonomous agent in a given circumstance or real-time scenario.

Additionally or alternatively, the system 100 can include and/or interface with any other suitable components.

4. Method

As shown in FIG. 2, the method 200 for remote assistance of an autonomous agent can include any or all of: receiving a first set of inputs associated with an autonomous agent S210; optionally determining a tele-assist event S215; providing a set of outputs to a tele-assist platform S220; receiving a second set of inputs from the tele-assist platform S230; determining an action for the agent based on the first set of inputs and/or the second set of inputs S240; and optionally implementing the action S250. Additionally or alternatively, the method 200 can include any or all of the processes described in any or all of: U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/540,836, filed 14 Aug. 2019; and U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; and U.S. application Ser. No. 17/712,757, filed 4 Apr. 2022, each of which is incorporated herein in its entirety by this reference, or any other suitable processes performed in any suitable order.

The method 200 is preferably performed with a system 100 as described above, but can additionally or alternatively be performed with any other suitable system.

The method 200 preferably functions to assist an autonomous agent in navigating uncertain and/or otherwise challenging environments, such as environments which the agent has not learned to classify. Additionally or alternatively, the method 200 can function to enable a monitoring of an interior of the agent (e.g., for safety of the passengers) and/or can perform any other functions.

The method 200 is preferably implemented in the context of a ride sharing use case involving the transport of passengers, such as any or all of: a shuttle service, on-demand ride service, robotic taxi, and/or any other passenger use cases. Additionally or alternatively, the method 200 can be implemented to transport goods (e.g., grocery delivery) and/or can be used for any other use cases.

The method 200 and/or sub-elements thereof can be executed once and/or can be executed repeatedly, recurrently, iteratively, periodically, cyclically, continuously, and/or with any other suitable timing. For example, the autonomous agent can elect a policy for each step of an election cycle (e.g., with a predetermined frequency, such as 10 Hz, 15 Hz, 20 Hz, 25 Hz, greater than 25 Hz, etc.) and autonomously control the vehicle based on the elected policy until a new policy is elected (e.g., at a next/subsequent step of the election cycle). In variants, combinations/permutations of method elements can occur sequentially, contemporaneously, synchronously, asynchronously, periodically, aperiodically (e.g., on an event driven basis), and/or with any other suitable frequency/timing.

4.1 Method—Receiving a First Set of Inputs Associated with an Agent S210

The method 200 preferably includes receiving a first set of inputs associated with an agent S210, which functions to receive information with which to perform any or all of the remaining processes of the method 200. In preferred variations, for instance, the first set of inputs received in S210 function to collect information with which to make decisions at an onboard computing system and/or at a tele-assist platform. Additionally or alternatively, S210 can perform any other suitable functions.

Additionally or alternatively, the method 200 can be performed in absence of S210 and/or include any other process(es).

S210 is preferably performed initially in the method 200, and further preferably multiple times (e.g., continuously, at a predetermined frequency, at a predetermined set of intervals, at random intervals, in response to a trigger, periodically/cyclically, once per election cycle of the MPDM and/or autonomous agent, etc.) during operation of the autonomous agent. Additionally or alternatively, S210 can be performed in response to any other process(es) of the method 200, in parallel with any other process(es) of the method 200, and/or at any other times. Further additionally or alternatively, the method 200 can be performed in absence of S210.

The first set of inputs is preferably at least partially received from a sensor system of the autonomous agent (e.g., as described above), such as from any or all of the sensors described above (e.g., LIDAR sensors, RADAR sensors, cameras, microphones, diagnostic sensors, etc.). Additionally or alternatively, inputs can be received from any suitable sensors (e.g., remote from the agent, part of one or more infrastructure devices, etc.), other information sources (e.g., online information sources, databases, etc.), other agents and/or objects, and/or any other suitable sources.

The set of inputs preferably includes a set of camera streams (equivalently referred to herein as video streams) collected from a set of cameras arranged onboard the autonomous agent. Additionally or alternatively, the set of inputs can include camera streams collected from an interior of the autonomous agent, information from a set of lidar sensors, information from a set of radar sensors, diagnostic information associated with one or more components of the autonomous agent (e.g., health information associated with sensors), and/or any other inputs.

In a first variation, S210 includes receiving a set of video streams collected from a set of cameras arranged onboard the autonomous agent, wherein the set of video streams depicts the environment of the autonomous agent. Additionally or alternatively, the first set of inputs can include information from a set of lidar sensors, information from a set of radar sensors, a second set of video streams with a view of an interior of the autonomous agent, information from infrastructure devices, and/or any other information.

Additionally or alternatively, S210 can include any or all of: receiving sensor measurements from vehicle sensors (e.g., sensor suite), retrieving stored data/information (e.g., from a memory of the computing system and/or remote data storage; such as a prior ego-vehicle state(s) and/or a prior environmental representation(s) generated by vehicle perception/tracking; etc.), a current environmental representations (e.g., generated by a perception/tracking system), a current vehicle state (e.g., which can include a vehicle position in an Earth coordinate frame), a current vehicle trajectory, a target vehicle path (e.g., predetermined and/or received from guidance/control systems), and/or any other suitable inputs.

In variants, S210 can optionally include processing sensor inputs to generate an environmental representation (e.g., using perception and/or tracking system/methods, such as those described in U.S. application Ser. No. 17/554,619, filed 17 Dec. 2021, which is incorporated herein in its entirety by this reference) and current vehicle state estimate (e.g., location/position, velocity, acceleration in various axes, throttle, steering angle, etc.). Alternatively, an environmental representation and/or current vehicle state, and/or any other suitable (pre-processed) inputs can be received during S210 (e.g., pre-processed by upstream elements of sensor data processing pipeline).

In a specific example, the inputs can include an environmental representation which includes a set of dynamic and set of static objects in an environment of the ego vehicle, each uniquely labeled with an identifier and object parameters which can include: a dynamic or static label, an object class (e.g., such as passenger vehicle, pedestrian, bicycle, etc.), object dimensions, object movement parameters (e.g., position, velocity, acceleration, etc.), and/or any other suitable information.

However, any other suitable inputs can be received during S210.

4.2 Method—Determining a Tele-Assist Event S215

The method 200 can optionally include determining a tele-assist event S215, which can function to initiate remote tele-assistance of the vehicle (e.g., when the vehicle is at/expecting an impasse or is otherwise unable to progress). For example, tele-assistance may be provided on a notification driven, discretized, and/or discontinuous basis in response to a determination of a tele-assist event, which may allow a single tele-operator to assist multiple vehicles.

Tele-assist events can be determined based on the sensor inputs received during S210, such as the ego vehicle state and/or environmental representation (e.g., and/or dynamic or static objects therein), predicted probabilities/scenarios, historical vehicle states, policies, and/or action determinations (e.g., according to S240), and/or any other suitable information. Tele-assist events can be determined according to a set of one or more thresholds, such as a time threshold during which the vehicle is stopped/stationary. Tele-assist events can be provided when the vehicle is stationary (e.g., stopped at an impasse), moving, traversing along a target vehicle path, traversing beyond a target vehicle path (or otherwise deviating from a target path or teleoperator approved path), and/or during any suitable vehicle state(s) or circumstances.

Additionally or alternatively, the set of thresholds can include any or all of: other time thresholds (e.g., vehicle stationary in a particular context-such as in the middle of a lane for more than a threshold amount of time, such as 15 seconds), speed thresholds (e.g., vehicle speed below a threshold speed, etc.), uncertainty thresholds (e.g., determined at the computing system), and/or any other thresholds or other triggers.

Additionally or alternatively, the tele-assist event can be determined based on one or probabilities and/or predicted scenarios. In some variations, for instance, a tele-assist event can be determined in response to a probability of the vehicle getting stuck (e.g., unable to easily merge back into traffic, unable to be moving again within a predetermined amount of time, etc.), wherein the probability can be an actual probability, a predicted probability (e.g., based on traffic ahead of the agent, based on environmental representation, based on a set of trained models, etc.), and/or any combination thereof.

Any or all of the triggers can optionally utilize information from infrastructure devices, such as those coupled to stoplights and/or having a view of stoplights. In some variations, for instance, in an event that the vehicle has been stopped for at least a minimum time threshold, information from the infrastructure device(s) can be used to determine if the vehicle is stopped at a red light, wherein if this is the case, a notification is not triggered to the teleoperator.

In a first variation, a tele-assist event can be determined in response to detecting that the vehicle has been stopped for at least a threshold amount of time (e.g., 1 minute, 2 minutes, between 1 minute and 5 minutes, less than 1 minute, greater than 5 minutes, etc.; at an impasse; etc.).

In a second variation, a tele-assist event can be determined in response to detecting that a classification of the agent's environment cannot be made and/or that an uncertainty associated with a classification is above a predetermined threshold. In a specific example, for instance, the teleoperator can be triggered in response to the onboard computing system having high uncertainty of its surroundings, such as in the event of the autonomous agent encountering a semi-truck facing the autonomous agent and backing up.

In a third variation, a tele-assist event can be determined in response to an activation of a fallback system and/or failure of the onboard computer to update the policy.

In a fourth variation, a tele-assist event can be determined in response to a determination that the vehicle cannot progress along a target path (e.g., an obstacle or obstruction is impeding the vehicle, an obstacle or obstruction is stopped/stationary along the target path, an obstacle or obstruction is stopped/stationary in front of the vehicle, etc.)

In a fifth variation, a tele-assist event can be determined in response to a policy being determined and/or selected which requires remote authorization (e.g., such as in order to deviate from a nominal driving rule, crossing a double yellow line, following a direction from construction personnel, etc.).

In a sixth variation, a tele-assist event can be determined based on a time threshold for the vehicle being stationary at an impasse along a target vehicle path.

In a seventh variation, a tele-assist event can be determined based on a probability threshold of an impasse occurrence along a target vehicle path.

In an eighth variation, tele-assist events can be determined based on a prior trigger based on the inputs in S230. For example, a tele-operator may prompt the vehicle to check-in again at one or more times/points during execution of an approved policy (or path) in order to reconfirm the policy or proceed (e.g., where only part of a policy is approved at a time). Accordingly, such triggers may occur repeatedly, periodically, or based on a secondary event trigger (e.g., reaching a waypoint, deviating from a tele-operator approved path, etc.), and/or with any other suitable timing.

However, a tele-assist event can be otherwise suitably determined. Alternatively, tele-assist events may not be determined in some implementations, such as in cases where tele-operators continuously monitor vehicle operations (e.g., and may need not be notified on an event driven basis).

4.2 Method—Providing a Set of Outputs to a Tele-Assist Platform S220

The method 200 preferably includes providing a set of outputs to a tele-assist platform S220, which functions to provide information which the teleoperators can view and/or analyze in order to assist the autonomous agent in navigating its environment. Additionally or alternatively, S220 can function to send alerts and/or notifications to teleoperators and/or perform any other functions.

Additionally or alternatively, the method 200 can be performed in absence of S220 and/or include any other process(es).

S220 is preferably performed in response to and based on S215 and/or S210, and further preferably multiple times (e.g., continuously, at a predetermined frequency, at a predetermined set of intervals, at random intervals, in response to a trigger, etc.) during operation of the autonomous agent, such as in response to each instance of S215 (e.g., for multiple election cycles following a tele-assist event, for a duration of deviation from a target path, for a predetermined period, etc.). Additionally or alternatively, S220 can be performed in response to any other process(es) of the method 200, in parallel with any other process(es) of the method 200, and/or at any other times. Further additionally or alternatively, the method 200 can be performed in absence of S220 (during periods of operation where no tele-assist events are detected, for example)

The teleoperators associated with the tele-assist platform are preferably human teleoperators, but can additionally or alternatively include and/or interface with robotic operators.

The set of outputs preferably includes any or all of the first set of inputs received in S210, such as any or all of: camera streams collected from a set of cameras viewing an environment of the autonomous agent; camera streams collected from a set of cameras viewing an interior of the autonomous agent; diagnostic information associated with the autonomous agent (e.g., health of sensors, etc.); information (e.g., speed, acceleration, vehicle state, etc.) from an onboard diagnostic port of the autonomous agent; information collected at a set of infrastructure devices; and/or any other inputs.

The set of outputs can additionally or alternatively include outputs determined based on (e.g., derived from, determined based on further processing of, etc.) the first set of inputs, such as a set of visualizations provided to teleoperators. The visualizations can include, for instance, proposed and/or predicted trajectories for the ego agent, proposed and/or predicted trajectories for other agents in an environment of the ego agent, a proposed maneuver for the autonomous agent, and/or any other visualizations.

The set of outputs can further additionally or alternatively include one or more notifications (e.g., messages, alerts, etc.) to the teleoperator, which can function to alert the teleoperator to a particular scenario in which input from the teleoperator is requested (e.g., vehicle stopped for 30 seconds, predicted slowdown ahead, etc.). The notifications can optionally include a proposed policy (e.g., behavior, action, maneuver, trajectory, etc.) and/or multiple proposed policies for the autonomous agent, wherein the teleoperator can approve and/or reject the proposed policies. Based on the teleoperator input (e.g., received during S230), the proposed policy (ies) can then either be included (e.g., if authorized/approved by the tele-operator) or excluded for consideration by the computing system in determining an optimal policy for the autonomous agent (e.g., as part of an MPDM module, during a current or subsequent election cycle).

For example, in some variants the computing system 120 (e.g., MPDM thereof) can determine (e.g., retrieve from a database) an autonomously unelectable policy or policy suggestion (e.g., in response to S215, in response to a determination that the vehicle is at an impasse) which can be provided as an output to the tele-operator in S220. A policy may be considered 'autonomously unelectable' as a result of a confidence score associated with the policy (e.g., confidence in vehicle being able to perform the policy, confidence in the vehicle being able to safely perform the policy, etc.; an autonomously unelectable policy can be a policy that is nominally unelectable without a tele-operator approval, but can becomes electable with tele-operator approval) falling below a predetermined threshold (e.g., a minimum threshold), a deviation of the policy from a nominal roadway rule/convention, a current context of the vehicle, and/or for any other suitable reason(s). Additionally or alternatively, policy suggestions provided as outputs during S220 can alternatively be electable, and/or no policy suggestion(s) may be provided.

The set of outputs is preferably communicated wirelessly via the communication interface 130 to the teleoperator platform 150. Additionally, the set of outputs are further preferably at least partially provided at a display associated with the set of teleoperators. The tele-assist platform can additionally or alternatively include speakers, microphones, and/or any other output devices. The tele-assist platform can further additionally or alternatively include any number of input devices configured receive the second set of inputs (e.g., as described below), such as, but not limited to: touch screens, buttons, joy sticks, microphones (e.g., with voice detection), and/or any other input devices.

In variants, the set of outputs can optionally include a top-down (bird's eye) view of the environmental representation, which includes estimated object parameters (e.g., dimensions, classifications, etc.) for the environmental representation, which may facilitate provision of waypoints by a tele-operator (e.g., to circumvent obstacles in the environment of the vehicle).

However, any other suitable set of outputs can be provided to a tele-assist platform.

4.3 Method—Receiving a Second Set of Inputs from the Tele-Assist Platform S230

The method 200 preferably includes receiving a second set of inputs from the tele-assist platform S230, which functions to receive assistance from the teleoperator in the decision making of the autonomous agent. Additionally or alternatively, S230 can perform any other functions.

Additionally or alternatively, the method 200 can be performed in absence of S230 and/or include any other process(es).

S230 is preferably performed in response to and based on S220 and optionally multiple times (e.g., continuously, at a predetermined frequency, at a predetermined set of intervals, at random intervals, in response to a trigger, etc.) during operation of the autonomous agent. Additionally or alternatively, S230 can be performed in response to any other process(es) of the method 200, in parallel with any other process(es) of the method 200, and/or at any other times. Further additionally or alternatively, the method 200 can be performed in absence of S230.

The second set of inputs is preferably received from the tele-assist platform and further preferably received from one or more teleoperators in response to viewing the set of outputs, but can additionally or alternatively be received from any other locations and/or entities. The second set of inputs is preferably received after or in response to a tele-assist event trigger, such as a threshold (e.g., stopped time) being exceeded. Additionally or alternatively, the second set of inputs can be received in absence of a trigger, in response to a different trigger, and/or at any other times.

The second set of inputs is preferably related to a policy and/or set of policies available to the autonomous agent, wherein a policy preferably refers to a behavioral policy prescribing a particular behavior (e.g., change lanes, maintain lanes, stop, increase speed, decrease speed, etc.) and/or action for the vehicle. Additionally or alternatively, a policy can include and/or prescribe any or all of: an action of the vehicle, a maneuver of the vehicle (e.g., crossing a set of lines), a trajectory of the vehicle (e.g., trace, set of waypoints, etc.), any or all of the set of parameters associated with implementing a behavior (e.g., vehicle speed, distance to be maintained relative to other objects and/or road geometry, vehicle locations, etc.), and/or any other information associated with the agent.

The set of policy inputs received in S230 can optionally correspond to policies which the agent may not be able to independently elect and/or consider for election on its own, such as policies which are any or all of: rare policies and/or policies corresponding to edge cases, policies which go against traffic rules and/or conventions (e.g., crossing a double lane line), policies which take the agent outside of a prescribed and/or fixed route, behaviors which the vehicle can normally elect but with different parameters and/or features (e.g., different speed, different distance maintained with respect to other objects, inclusion of the vehicle's location crossing a lane line, etc.), and/or any other policies. Additionally or alternatively, the policies can include those which the agent can elect and/or consider for election without teleoperator input.

The second set of inputs can include any or all of: an approval (e.g., permission) of a specific proposed policy (e.g., crossing a double line on the road, driving on to the shoulder, diverting from a fixed route, etc.); a rejection of a specific proposed policy; an addition of a policy (e.g., outside of a set that the vehicle itself can elect); a custom policy (e.g., based on a trajectory trace created by the teleoperator); and/or any other inputs.

In a first set of variations, for instance, the second set of inputs includes a policy (e.g., action, behavior, maneuver, etc.) for consideration by the autonomous system (e.g., onboard computing system). In a first set of specific examples, the second set of inputs includes an approval indication by the teleoperator of a policy proposed to the teleoperator. In a second set of specific examples, additional or alternative to the first, the second set of inputs includes an additional policy suggested by the teleoperator, wherein the additional policy can be selected from a set of non-standard policies, for instance. Additionally or alternatively, the second set of inputs can include a rejection of a proposed policy. In specific examples, for instance, a policy might be proposed to the teleoperator, which the teleoperator identifies as being non-optimal (e.g., inefficient, disruptive to riders, takes the vehicle off of a fixed route, etc.), dangerous (e.g., takes the vehicle through a construction zone, takes the vehicle through a high pedestrian area, etc.), or otherwise non-ideal. As such, the teleoperator can reject the proposed policy and therefore prevent the agent from considering the proposed policy (e.g., in a MPDM framework).

In a second set of variations, the second set of inputs can include a custom maneuver from the teleoperator, such as a trace for a trajectory of the vehicle drawn (e.g., at a touch interface) and/or a set of waypoints associated therewith, and/or otherwise created by the teleoperator. In a specific example, the second set of inputs can include a tele-operator-approved trace or path in the form of a set of waypoints which circumvents an obstacle (e.g., dynamic or static) along a target vehicle path. In an additional or alternative specific example, the teleoperator can provide a set of waypoints in response to determining that a proposed (autonomously unelectable) policy is non-optimal (e.g., unsafe, will not succeed in overcoming the vehicle being stuck, etc.).

In a set of specific examples, this teleoperator-approved path can be used as an input for the MPDM module (e.g., in place of a target path, together with the target path, etc.), such that policies are simulated and/or selected in accordance with one or both of these paths (e.g., wherein a policy is selected which helps maneuver the vehicle around the obstacle and back on to the target path).

In a third set of variations, the second set of inputs can include a binary decision by a tele-operator (e.g., approval/rejection of a proposed optimal policy). In a fourth set of variations, the second set of inputs can include a command from a teleoperator for the vehicle, such as to wait (e.g., remain stopped), which can function to enable the vehicle to collect more sensor data and gain a better understanding of its environment (e.g., better understand how other objects are moving, classify object types with greater confidence, etc.) before moving and/or electing a new policy. The wait command is preferably utilized in accordance with the MPDM module such that policies which cause the vehicle to move are down-weighted and/or down-scored (e.g., thereby making them less attractive for selection by the vehicle, such that they are only selected if their down-weighted score still outperforms other policy scores, etc.). In specific examples, the teleoperator can provide a wait command voluntarily (e.g., in absence of S215. Alternatively, a waiting behavior can be proposed as an autonomously unelectable policy, included in the set of electable policies, used to override the vehicle's decision-making, and/or be otherwise used. Additionally or alternatively, a teleoperator can provide and/or approve a "proceed" policy, allowing the vehicle to progress following provision of a wait command. For example, the wait command may be executed by default upon arrival at a vehicle destination, entering the vehicle and/or policy selection into a holding pattern with the vehicle waiting for a teleoperator approval in order to proceed. Alternatively, the vehicle can be configured to autonomously exit a wait command, or a wait command may be overridden manually by a human (e.g., initiating departure of the vehicle).

Additionally or alternatively, the second set of inputs can include any other information.

4.4 Method—Determining an Action for the Agent Based on the First Set of Inputs and/or the Second Set of Inputs S240

The method 200 preferably includes determining an action for the agent based on the first set of inputs and/or the second set of inputs S240, which functions to perform decision making for the autonomous agent based on any or all of the inputs described above.

Additionally or alternatively, the method 200 can be performed in absence of S240 and/or include any other process(es).

S240 is preferably performed in response to and based on S230 and optionally multiple times (e.g., continuously, at a predetermined frequency, at a predetermined set of intervals, at random intervals, in response to a trigger, etc.) during operation of the autonomous agent. Additionally or alternatively, S240 can be performed in response to any other process(es) of the method 200, in parallel with any other process(es) of the method 200, and/or at any other times. Further additionally or alternatively, the method 200 can be performed in absence of S240.

S240 is preferably performed by the onboard computing system based on any or all of the first set of inputs and the second set of inputs. S240 is further preferably performed in accordance with a multi-policy decision-making module (e.g., as described above), wherein inputs received from the teleoperator in S240 can be used to determine which policies the autonomous agent can select from the in MPDM module. In some variations, for instance, an approval of a proposed policy by the teleoperator functions to include that proposed policy in the group of policies for the computing system to consider and select from, and a rejection of a proposed policy excludes that policy from being considered by the computing system.

In variants, S240 is preferably performed based on a target vehicle path, such as a predetermined vehicle route or path (e.g., determined prior to runtime, determined in a prior election cycle, etc.) for the vehicle. As an example, the system and/or MPDM can be configured to favor policies which closely follow the target path (e.g., using a cost function or set of selection criteria/heuristics, etc.; where the system generally follows the target path under nominal operation; etc.). Additionally or alternatively, in an event that the teleoperator provides a trace for a trajectory of the autonomous agent in S240, S250 can include planning a path for the vehicle based on that trace (and/or a set of waypoints associated therewith) which deviates from the target vehicle path. In one example, for instance, the teleoperator can provide a set of waypoints for the autonomous agent in S240, wherein in S250, the computing system plans a path for the autonomous agent which does any or all of: follows the waypoints (or favors trajectories following the waypoints in policy selection), hits a maximum number of waypoints, hits at least a predetermined number of waypoints, hits an initial waypoint, hits a final waypoint, and/or otherwise plans a path based on the waypoints. This can be included as a policy available to the agent (e.g., and may be the only policy in extreme edge cases where no viable policies are available to the agent) in cases where the vehicle is stuck (e.g., within a construction zone), upon determination by the teleoperator that the vehicle is stuck or will be stuck, and/or at any other times. Additionally or alternatively, the policy/action selection can consider the teleoperator approved path while still retaining decision authority to deviate from the waypoints and/or revert to the (prior) target path. In one example, in response to receiving a tele-operator-approved path and/or waypoints during S230, the target vehicle path can be updated based on the path, and autonomously controlling the vehicle can include: selecting an updated policy from the set of electable policies, wherein the updated policy deviates from the tele-operator-approved path (and/or the target path; an example is shown in FIG. 7B). Alternatively, the vehicle may follow the tele-operator approved path (and/or a portion thereof) and/or a portion of the target path exactly.

Figure 7A:
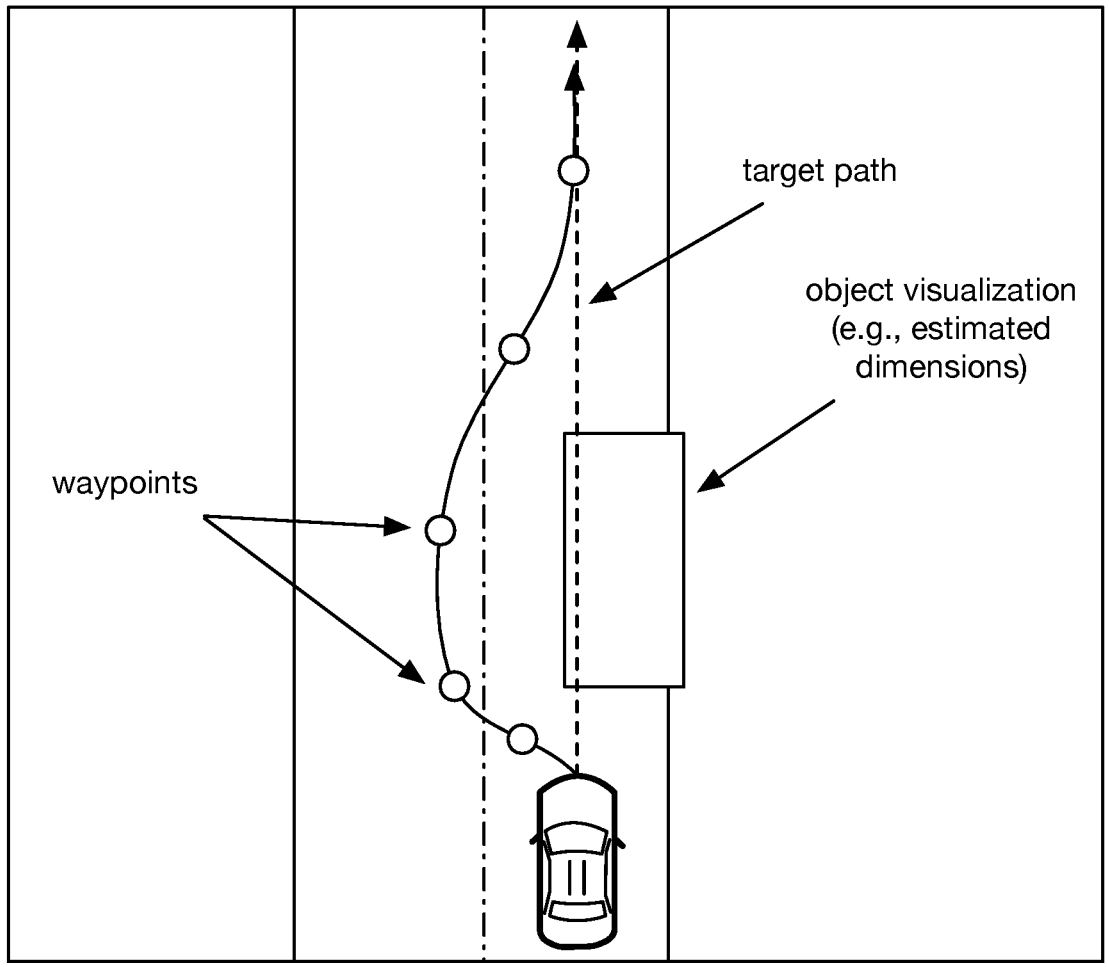
FIGS. 7A-B depict a schematic example of control based on a teleoperator provided path in a variant of the method.
Figure 7B:
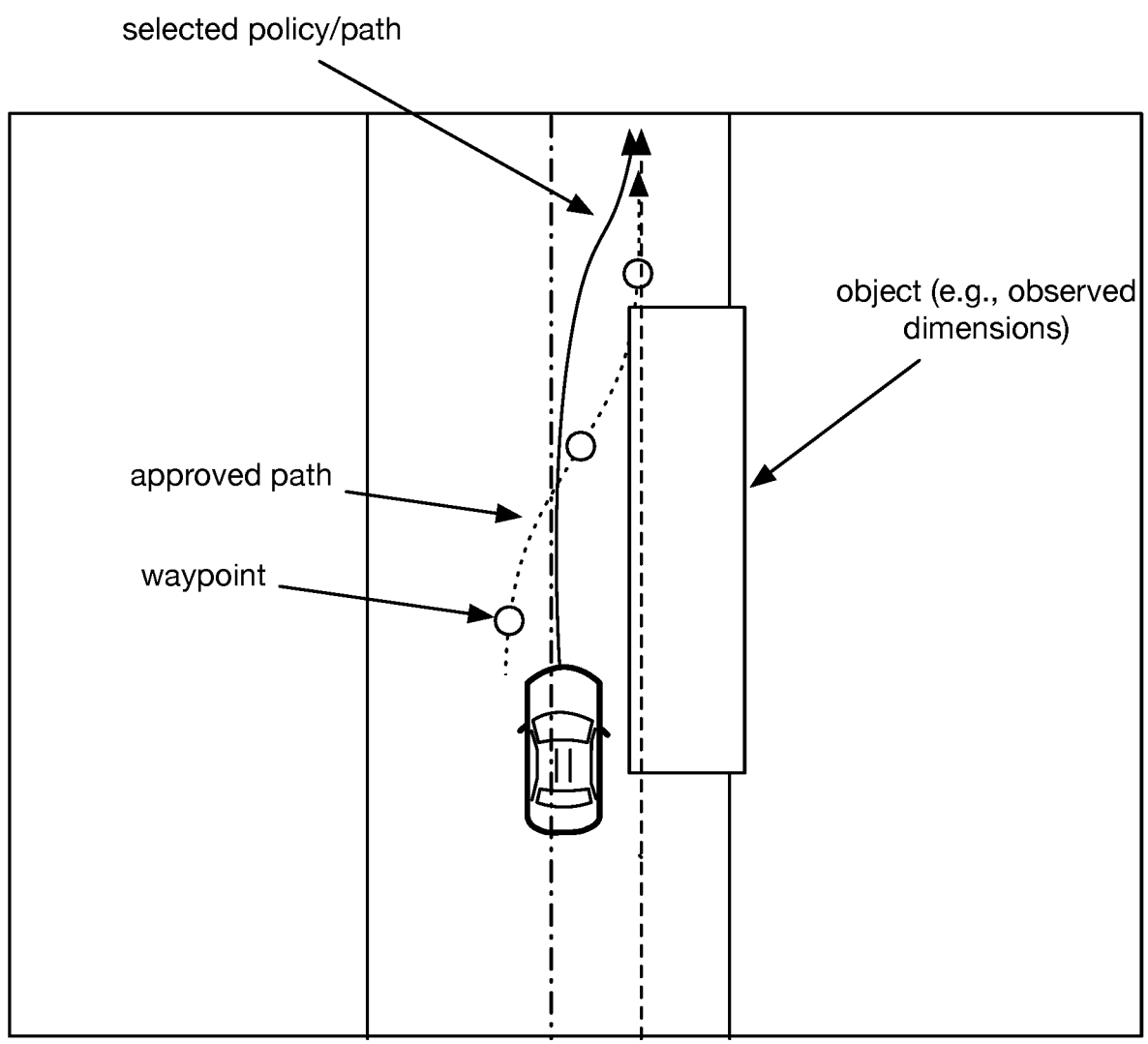

In an illustrative example, the tele-operator may provide waypoints based on a top-down (bird's eye) view of the environmental representation (e.g., an example is shown in FIG. 7A-B), which includes estimated object dimensions (e.g., as determined with a classifier of the computing system, as determined based on a classified object type such as car vs. truck vs. bus, etc.) for an obstacle in front of the vehicle (e.g., such as a large truck). However, the dimensions—particularly the length—of the obstacle may not be directly or easily observable via vehicle sensors (e.g., for example, a 72 foot Class 8 semi-truck may be visually similar to a 26 foot moving truck when viewed from behind). Thus, the vehicle may deviate from the tele-operator approved path (returning to the prior target path earlier or later) based on subsequent environmental observations (e.g., which directly observe the dimensions of the obstacle, as the vehicle begins to go around the object and consequently collects more information from the onboard sensors, etc.).

In a second example, in S240 a policy is selected using a multi-policy decision module of the autonomous agent which defines a tele-operator policy decision node and a set of autonomous policy decision nodes downstream of the tele-operator decision node. For example, a policy can be added to a set of electable policies based on a binary decision by a tele-operator and can then be (subsequently) evaluated by the multi-policy decision module along with the set of electable policies.

In one set of variants, S240 can include: determining a set of electable policies based on the first and second sets of inputs (e.g., using the MPDM). In some variants, the set of electable policies can be determined from a predetermined set based on the vehicle position estimate and/or a scenario (e.g., environmental representation, vehicle state estimate, etc.), where the scenario is used to refine the set of electable policies.

Additionally or alternatively, S240 can include any other processes and/or be otherwise suitably performed.

4.5 Method—Implementing the Action S250

The method 200 can include implementing the action S250, which functions to perform the action for the autonomous agent.

Additionally or alternatively, the method 200 can be performed in absence of S250 and/or include any other process(es).

S250 is preferably performed in response to and based on S240 and optionally multiple times (e.g., continuously, at a predetermined frequency, at a predetermined set of intervals, at random intervals, in response to a trigger, etc.) during operation of the autonomous agent. Additionally or alternatively, S250 can be performed in response to any other process(es) of the method 200, in parallel with any other process(es) of the method 200, and/or at any other times. Further additionally or alternatively, the method 200 can be performed in absence of S250.

S250 preferably includes implementing the selected policy determined in S240, but can additionally or alternatively include any or all of: determining a trajectory and/or path planning (e.g., at a motion planner) for the autonomous agent based on the selected policy, operating controls of the autonomous agent based on the selected policy, and/or any other processes. As an example, S250 can include determining vehicle instructions (e.g., for various systems and/or ECUs onboard the vehicle) and controlling the vehicle according to the instructions.

In a specific example, a tele-operator may have no direct authority over vehicle motion planning and/or execution of vehicle actions/policies. For instance, the tele-operator may not have the ability to directly intervene to adjust a steering angle, engage the throttle, apply brakes, or otherwise execute vehicle actions. In an illustrative example, the tele-operator may be able to approve a policy to nudge to the left of the lane to facilitate a subsequent policy determination (e.g., determine if it is safe to pass a wide tractor traveling 5 mph on a one lane highway). However, the vehicle, upon initiating this policy, may observe an oncoming vehicle and react quickly (e.g., by returning to the center of the lane) without the involvement of the tele-operator or the communication latency introduced by the direct involvement of the tele-operator.

In a first variation of the method 200, the method includes receiving a first set of inputs associated with an ego agent S210, wherein the first set of inputs includes sensor information collected onboard the ego agent and optionally information from a set of one or more infrastructure devices; providing a set of outputs to a tele-assist platform S220, wherein the set of outputs includes any or all of the first set of inputs and optionally one or more alerts and/or notifications; receiving a second set of inputs from the tele-assist platform S230, wherein the second set of inputs includes inputs related to a set of policies available to the ego agent; optionally determining an action for the ego based on the first and second sets of inputs S240; and optionally implementing the action S250. Additionally or alternatively, the method 200 can include any other processes performed in any suitable order.

Figure 3A:
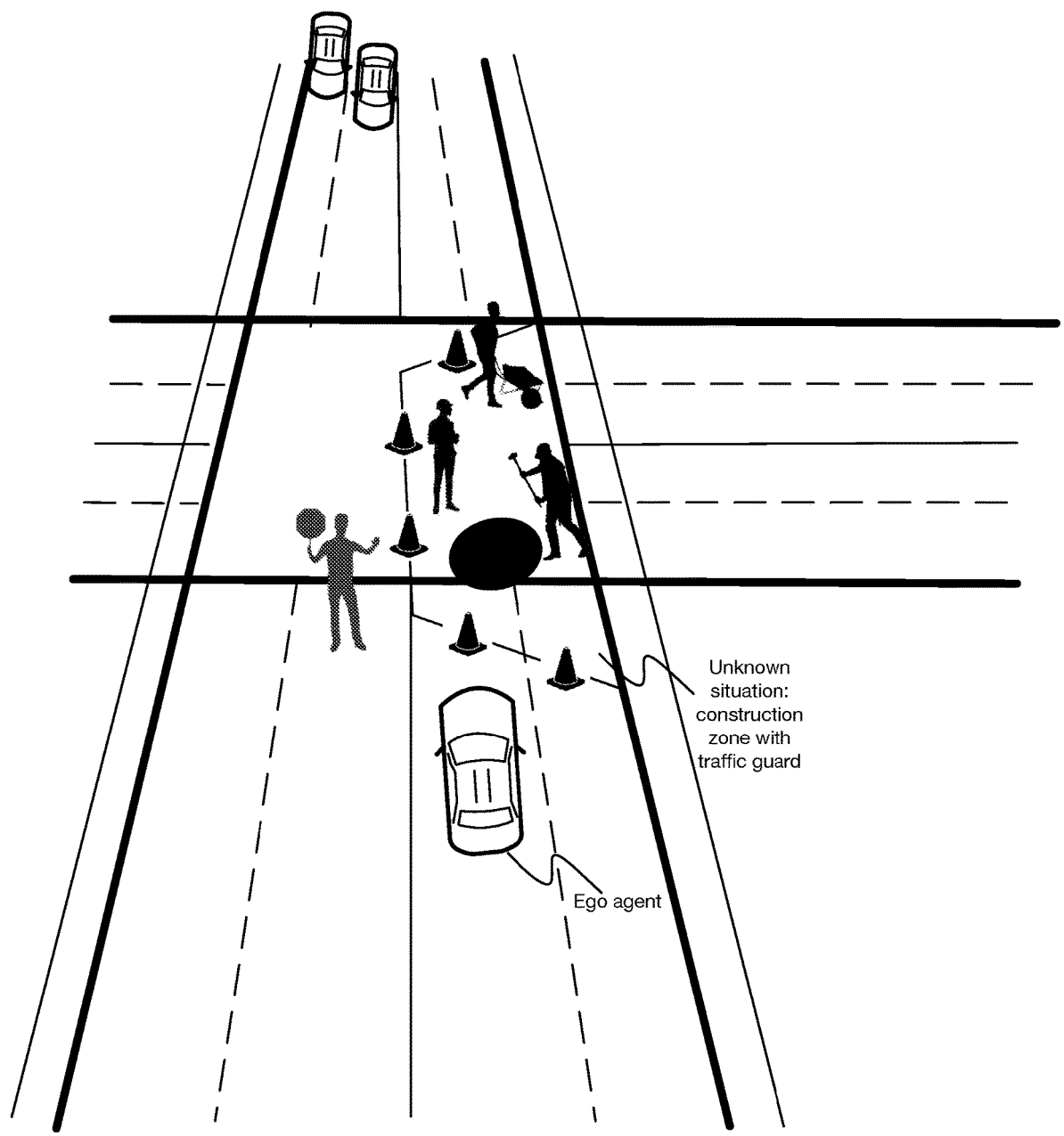
FIGS. 3A-3C depict a schematic variation of the method for remote assistance of an autonomous agent.
Figure 3B:
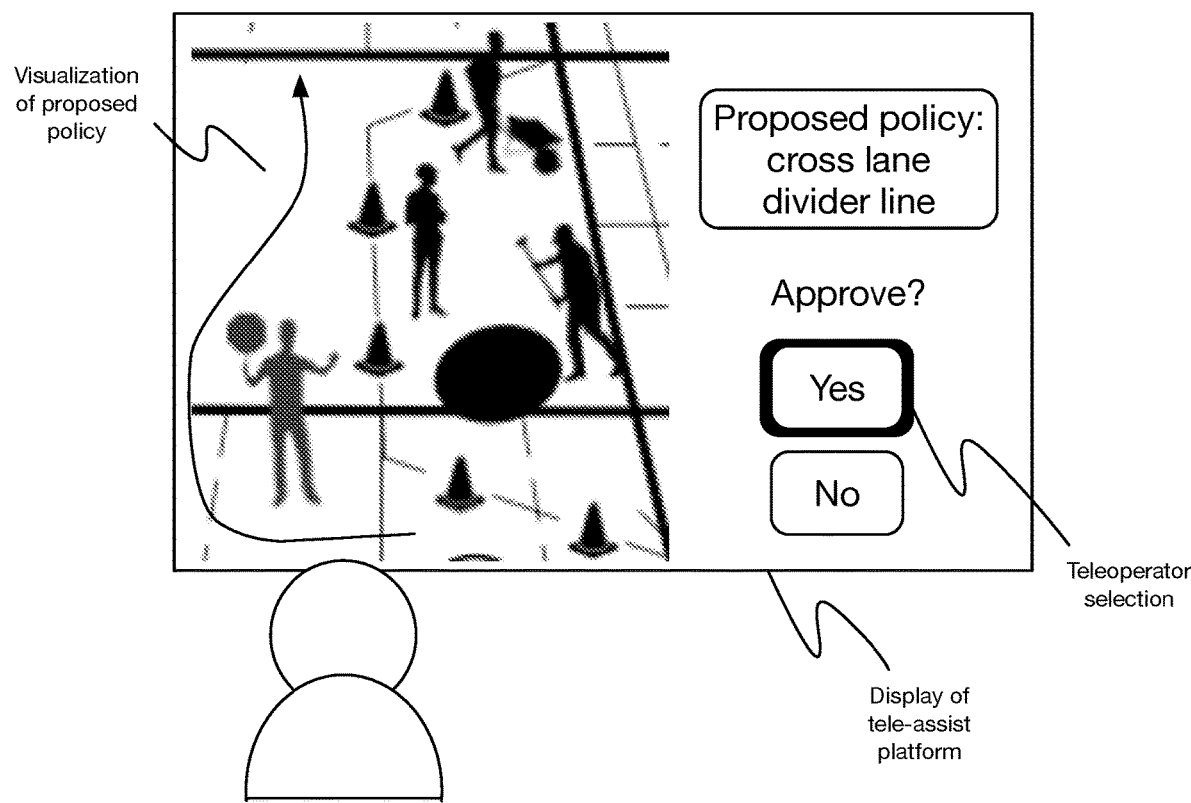
Figure 3C:
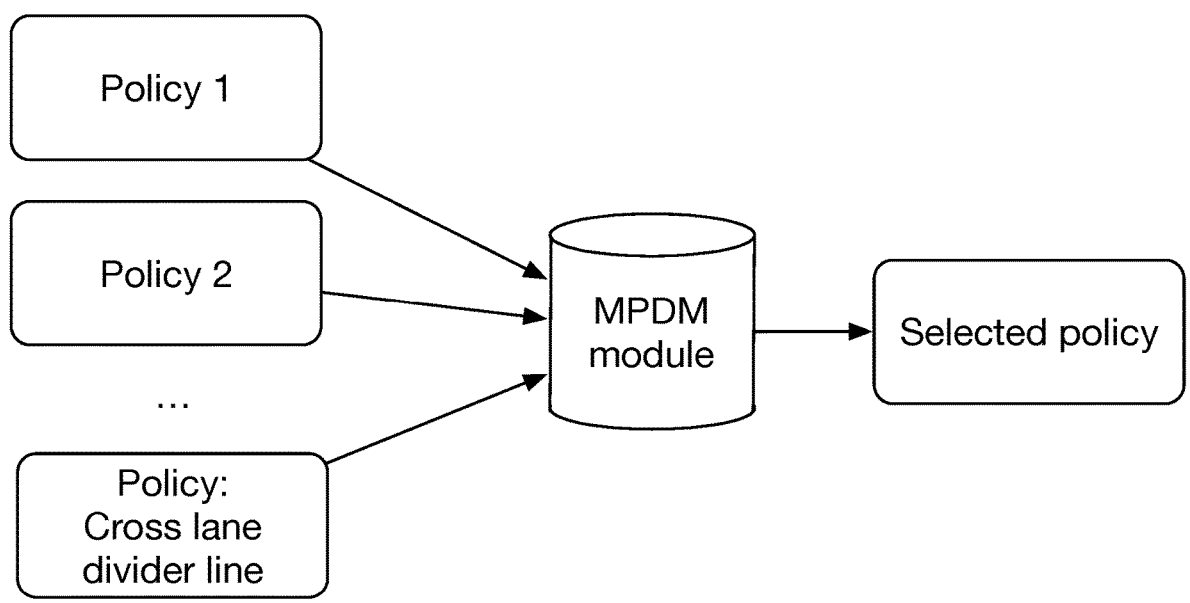

In a specific example (e.g., as shown in FIGS. 3A-3C), the method 200 includes detecting that the ego agent's path is blocked by an obstacle (e.g., based on a time threshold being exceeded), such as an obstacle that the vehicle is unfamiliar with; transmitting this sensor information from the agent (and optionally one or more infrastructure devices) and a proposed maneuver for the agent to a tele-assist platform; receiving an input from the teleoperator regarding the proposed maneuver; in an event that the teleoperator confirms the proposed maneuver, adding the proposed maneuver to a set of policies for consideration by the onboard computing system (e.g., an MPDM module of the onboard computing system); in an event that the teleoperator rejects the proposed maneuver, refraining from adding the proposed maneuver to the set of policies for consideration by the onboard computing system; selecting a proposed maneuver from the set of available policies (e.g., by the MPDM module); and operating the ego agent based on the selected maneuver.

Figure 5:
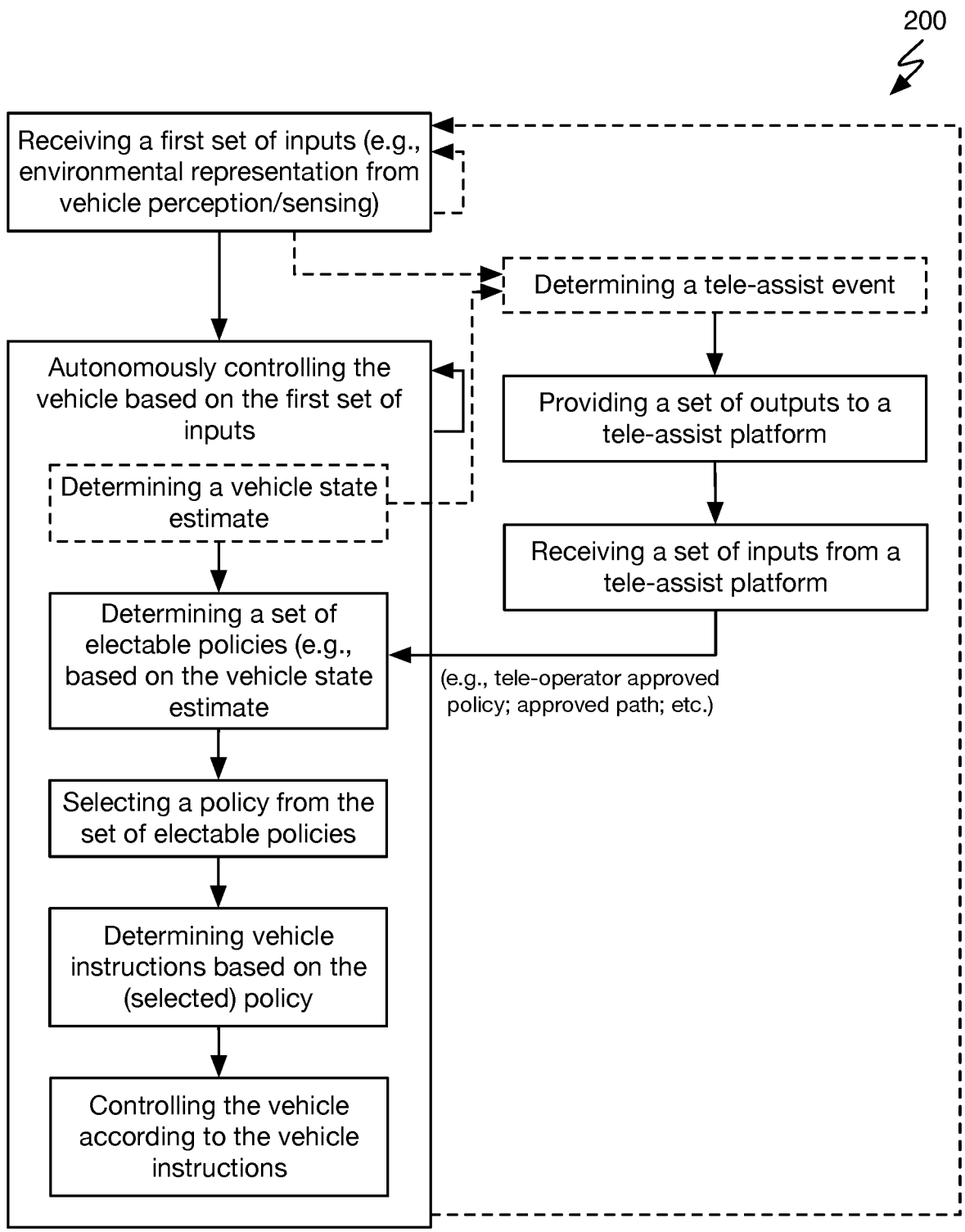
FIG. 5 depicts a schematic variation of the method for remote assistance of an autonomous agent.

In a second variant (e.g., an example is shown in FIG. 5), the method 200 can include: autonomously controlling a vehicle with an onboard computing system of the vehicle, including, at each election step of an election cycle: determining a vehicle state estimate based on a set of sensor inputs; determining a set of electable policies based on the vehicle state estimate; selecting a policy from the set of electable policies; determining vehicle instructions based on the policy; and controlling the vehicle according to the vehicle instructions; and while autonomously controlling the vehicle: based on the vehicle state estimate, determining satisfaction of an event trigger; based on the event trigger satisfaction, providing a set of outputs to a tele-assist platform; and updating the set of electable policies to include a tele-operator-approved policy determined with the tele-assist platform. In an example, the tele-operator approved policy can include a set of waypoints provided by the tele-operator (e.g., which circumvent an obstacle in the vehicle environment), which the vehicle can elect to follow (e.g., temporarily deviating from the target path, modifying/updating the target path, etc.).

Figure 6:
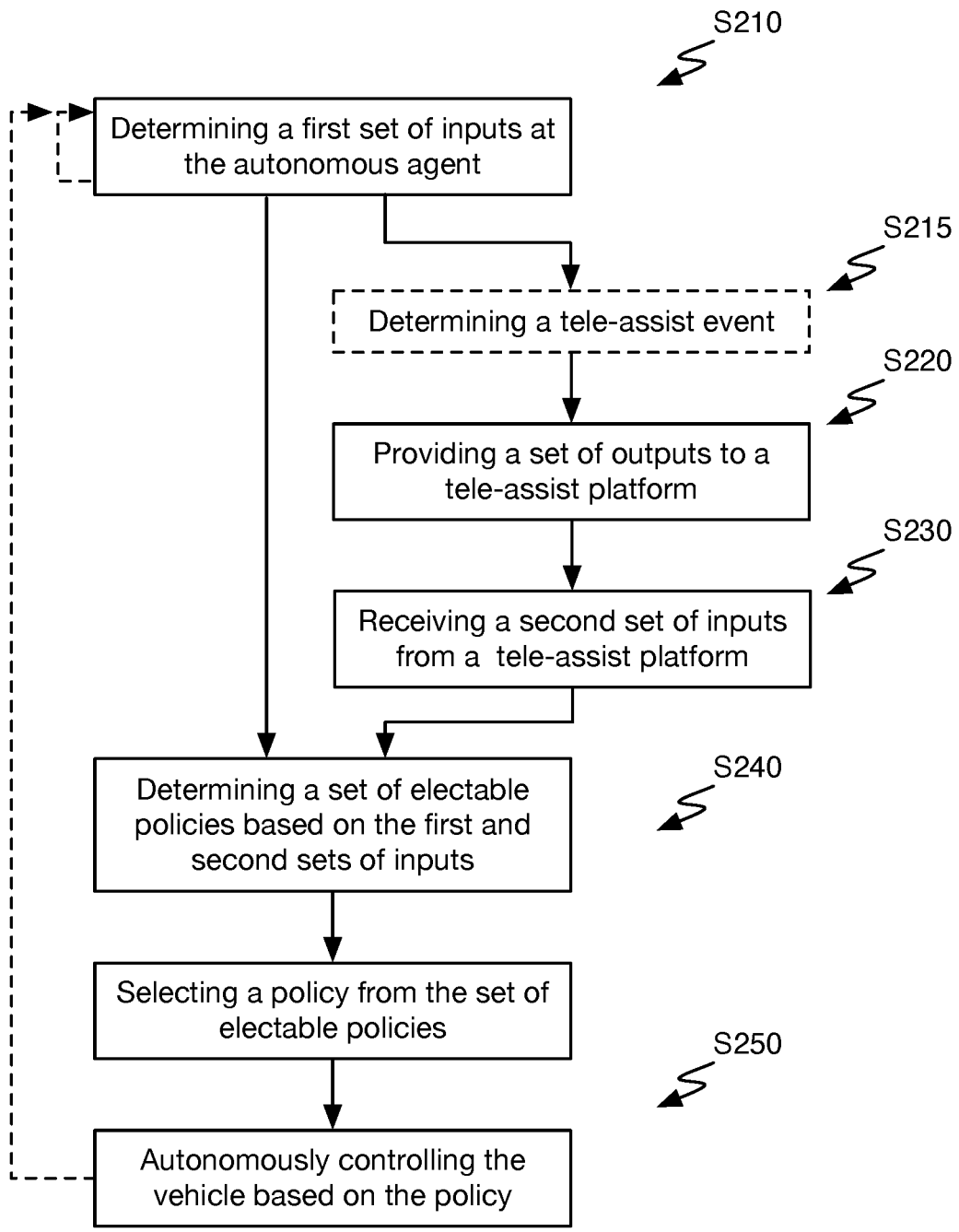
FIG. 6 depicts a schematic variation of the method for remote assistance of an autonomous agent

In a third variant (e.g., an example is shown in FIG. 6), the method 200 can include: at the autonomous agent, determining a first set of inputs; based on the first set of inputs, determining satisfaction of an event trigger associated with an impasse along a target path; based on the event trigger satisfaction, providing a set of outputs to a tele-assist platform; receiving a second set of inputs from the tele-assist platform; determining a set of electable policies based on the first and second sets of inputs; at the autonomous agent, selecting a policy from the set of electable policies based on the target path; and autonomously controlling the vehicle based on the policy.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPU, GPUs, TPUS, microprocessors, or ASICs, but the instructions can alternatively or additionally be executed by any suitable dedicated hardware device.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method for consideration of teleoperator input in the operation of an autonomous vehicle, the method comprising:
    with a computing subsystem onboard the autonomous vehicle:
        detecting satisfaction of a trigger condition;
        receiving the teleoperator input, wherein the teleoperator input comprises a set of waypoints associated with the trigger condition;
        based on the set of waypoints, determining a plurality of predefined autonomously electable policies, each comprising a set of rules for decision-making;
        evaluating a set of aggregated decision options, the set of aggregated decision options comprising:
            the set of waypoints;
            the set of predefined autonomously electable policies;
        selecting one of the set of aggregated decision options based on the evaluation, wherein the evaluation comprises simulating each of the set of predefined autonomously electable policies; and
    with a control subsystem in communication with the computing subsystem, operating the autonomous vehicle in accordance with the selected decision option.

2. The method of claim 1, wherein the trigger condition is associated with the autonomous vehicle's environment.

3. The method of claim 2, wherein the trigger condition comprises exceeding a predetermined probability threshold.

4. The method of claim 3, wherein the probability threshold is associated with a probability of the autonomous vehicle being stopped by an obstacle in the autonomous vehicle's environment.

5. The method of claim 1, further comprising providing a set of input options to a teleoperator interface in response to detecting satisfaction of the trigger condition, wherein the teleoperator input is received in response to providing the set of input options.

6. The method of claim 5, wherein the set of input options comprises a waypoint provision interface, wherein the set of waypoints is received at the waypoint provision interface.

7. The method of claim 6, wherein the set of inputs options further comprises a set of teleoperator-electable policy options, wherein in an event that the teleoperator input comprises a selected teleoperator-electable policy option from the set of teleoperator-electable policy options, the set of aggregated decision options further comprises the selected teleoperator-electable policy option.

8. The method of claim 1, wherein evaluating the set of aggregated decision options comprises performing a set of simulations.

9. The method of claim 8, wherein the selected decision option is determined based on a set of parameter values produced from the set of simulations.

10. The method of claim 9, wherein the set of parameters values comprises a score associated with the set of waypoints and a set of scores associated with each of the set of predefined autonomously electable policies.

11. A system for consideration of teleoperator input in the operation of an autonomous vehicle while navigating the autonomous vehicle along a target path, the system comprising:
    a computing subsystem onboard the autonomous vehicle, wherein the computing subsystem is configured to:
        detect satisfaction of a trigger condition;
        receive the teleoperator input, wherein the teleoperator input comprises a set of waypoints associated with the trigger condition;
        update the target path based on the set of waypoints;
        evaluate a set of aggregated decision options, the set of aggregated decision options comprising:
            the set of waypoints;
            a set of autonomously electable policies, each comprising a set of rules for decision-making;
        select one of the set of aggregated decision options based on the evaluation and the updated target path; and
    a control subsystem in communication with the computing subsystem, wherein the control subsystem is configured to operate the autonomous vehicle in accordance with the selected decision option.

12. The system of claim 11, wherein the trigger condition is associated with the autonomous vehicle's environment.

13. The system of claim 12, wherein the trigger condition comprises exceeding a predetermined probability threshold.

14. The system of claim 13, wherein the probability threshold is associated with a probability of the autonomous vehicle being stopped by an obstacle in the autonomous vehicle's environment.

15. The system of claim 11, wherein the computing subsystem is further configured to provide a set of input options to a teleoperator interface in response to detecting satisfaction of the trigger condition, wherein the teleoperator input is received in response to providing the set of input options.

16. The system of claim 15, wherein the set of input options comprises a waypoint provision interface, wherein the set of waypoints is received at the waypoint provision interface.

17. The system of claim 16, wherein the set of inputs options further comprises a set of teleoperator-electable policy options, wherein in an event that the teleoperator input comprises a selected teleoperator-electable policy option from the set of teleoperator-electable policy options, the set of aggregated decision options further comprises the selected teleoperator-electable policy option.

18. The system of claim 11, wherein the computing subsystem is further configured to, in evaluating the set of aggregated decision options, perform a plurality of simulations for each aggregated decision option of the set.

19. The system of claim 18, wherein the selected decision option is determined based on a set of parameter values produced from the set of simulations.

20. The system of claim 19, wherein the set of parameters values comprises a score associated with the set of waypoints and a set of scores associated with each of the set of autonomously electable policies.

21. The method of claim 1, wherein the set of aggregated decision options comprises policies determined before satisfaction of the trigger condition and policies determined after satisfaction of the trigger condition.

* * * * *